US010884701B2

United States Patent
Thangarathnam et al.

(10) Patent No.: US 10,884,701 B2
(45) Date of Patent: Jan. 5, 2021

(54) VOICE ENABLING APPLICATIONS

(71) Applicant: Amazon Technologies, Inc., Seattle, WA (US)

(72) Inventors: Manikandan Thangarathnam, Seattle, WA (US); Suraj Gopalakrishnan, Seattle, WA (US)

(73) Assignee: Amazon Technologies, Inc., Seattle, WA (US)

(*) Notice: Subject to any disclaimer, the term of this patent is extended or adjusted under 35 U.S.C. 154(b) by 0 days.

(21) Appl. No.: 16/708,102

(22) Filed: Dec. 9, 2019

(65) Prior Publication Data

US 2020/0183648 A1    Jun. 11, 2020

Related U.S. Application Data

(63) Continuation of application No. 15/836,428, filed on Dec. 8, 2017, now Pat. No. 10,503,468.

(51) Int. Cl.
| | |
|---|---|
| *G06F 3/16* | (2006.01) |
| *G10L 15/22* | (2006.01) |
| *G06F 40/30* | (2020.01) |
| *G06F 40/295* | (2020.01) |

(52) U.S. Cl.
CPC ............ *G06F 3/167* (2013.01); *G06F 40/295* (2020.01); *G06F 40/30* (2020.01); *G10L 15/22* (2013.01); *G10L 2015/223* (2013.01)

(58) Field of Classification Search
CPC ........ G06F 3/167; G06F 40/30; G06F 40/295; G10L 15/22; G10L 2015/223
See application file for complete search history.

(56) References Cited

U.S. PATENT DOCUMENTS

| | | | |
|---|---|---|---|
| 6,477,498 B1 | 11/2002 | Gortz et al. | |
| 10,056,078 B1 | 8/2018 | Shepherd et al. | |
| 10,096,319 B1 | 10/2018 | Jin et al. | |
| 10,147,426 B1 | 12/2018 | Mese et al. | |

(Continued)

FOREIGN PATENT DOCUMENTS

| | | |
|---|---|---|
| KR | 20180086718 | 8/2018 |
| WO | WO2017200777 | 11/2017 |

OTHER PUBLICATIONS

Office action for U.S. Appl. No. 15/836,428, dated Mar. 29, 2019, Thangarathnam, "Voice Enabling Applications", 35 pages.

(Continued)

*Primary Examiner* — Yogeshkumar Patel
(74) *Attorney, Agent, or Firm* — Lee & Hayes, P.C.

(57) ABSTRACT

Systems and methods for voice control of computing devices are disclosed. Applications may be downloaded and/or accessed by a device having a display, and content associated with the applications may be displayed. Many applications do not allow for voice commands to be utilized to interact with the displayed content. Improvements described herein allow for non-voice-enabled applications to utilize voice commands to interact with displayed content by determining screen data displayed by the device and utilizing the screen data to determine an intent associated with the application. Directive data to perform an action corresponding to the intent may be sent to the device and may be utilized to perform the action on an object associated with the displayed content.

20 Claims, 12 Drawing Sheets

(56) References Cited

U.S. PATENT DOCUMENTS

| | | | |
|---|---|---|---|
| 10,269,345 B2 | 4/2019 | Castillo Sanchez et al. | |
| 2001/0041980 A1 | 11/2001 | Howard et al. | |
| 2012/0030712 A1 | 2/2012 | Chang | |
| 2014/0282003 A1 | 9/2014 | Gruber et al. | |
| 2015/0248886 A1 | 9/2015 | Sarikaya et al. | |
| 2015/0254058 A1* | 9/2015 | Klein | G06F 3/167 704/275 |
| 2015/0382047 A1* | 12/2015 | Van Os | G10L 15/26 725/38 |
| 2016/0132568 A1 | 5/2016 | Vogel et al. | |
| 2016/0358603 A1 | 12/2016 | Azam et al. | |
| 2017/0169829 A1 | 6/2017 | Celikyilmaz et al. | |
| 2017/0230709 A1 | 8/2017 | Van Os et al. | |
| 2017/0358305 A1 | 12/2017 | Kudurshian et al. | |
| 2018/0190275 A1 | 7/2018 | Bhaya et al. | |
| 2018/0211663 A1 | 7/2018 | Shin et al. | |
| 2018/0233140 A1 | 8/2018 | Koishida et al. | |
| 2018/0359198 A1 | 12/2018 | Eidem et al. | |
| 2019/0179606 A1 | 6/2019 | Thangarathnam et al. | |
| 2019/0179607 A1 | 6/2019 | Thangarathnam et al. | |

OTHER PUBLICATIONS

Office Action for U.S. Appl. No. 15/836,566, dated Nov. 29, 2019, Thangarathnam, 'Voice Control of Computing Devices', 15 Pages.

The PCT invitation to Pay Additional Fees dated Mar. 6, 2019 for PCT Application No. PCT/US2018/064577, 13 pages.

The PCT Search Report and Written Opinion dated May 3, 2019 for PCT Application No. PCT/US2018/064577, 18 pages.

Office Action for U.S. Appl. No. 15/836,566, dated Jun. 11, 2020, Thangarathnam, "Voice Control of Computing Devices", 18 Pages.

Rutkas, "Using Cortana to interact with your customers ( 10 by 10 )", Microsoft, Windows Developer Blog, Aug. 2015, 13 pgs.

Whitenton, "Voice First: The Future of Interaction?", Neilsen Norman Group Nov. 2017, , 12 pgs.

\* cited by examiner

VOICE ENABLING APPLICATIONS

CROSS REFERENCE TO RELATED PATENT APPLICATIONS

This application is a continuation of and claims priority to U.S. patent application Ser. No. 15/836,428, filed on Dec. 8, 2017, entitled "Voice Enabling Applications".

BACKGROUND

A user typically interacts with displayed content through tactile means, such as a remote control, a mouse, a keyboard, and/or touch input. Described herein are improvements in technology that will help, among other things, to provide additional input means for displayed content.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DETAILED DESCRIPTION

Figure 1:
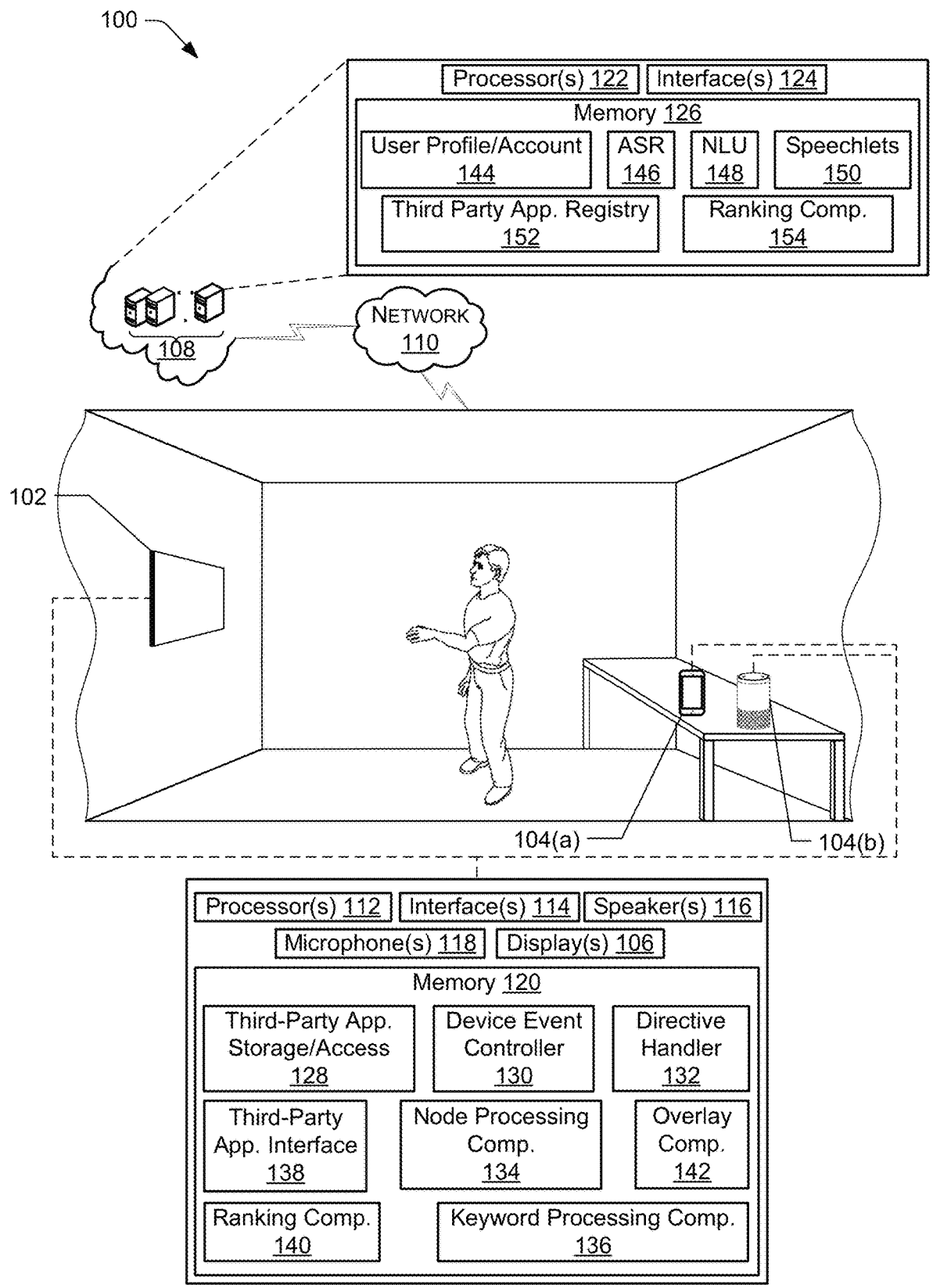
FIG. 1 illustrates a schematic diagram of an example environment for controlling computing devices via audible input.

Systems and methods for voice control of computing devices are described herein. Take, for example, a content-viewing application being displayed on a user device, such as a television. Typically, when the user desires to interact with the content being displayed on the device, the user uses tactile means of user input, such as pressing buttons on a remote control, moving and pressing buttons on a mouse, pressing keys on a keyboard, and/or providing touch input in examples where the user device includes a touchscreen. While these input means may be functional, additional input means may be required and/or desired by the user. Described herein are systems and methods for voice control of computing devices, particularly when the computing devices are displaying content associated with an application that has not been developed with voice-control functionality. These applications will be described herein as third-party applications.

By way of example, a user may download or otherwise gain access to a third-party application that has been optimized for input controls other than voice-based input controls (e.g., touch screen, keyboard, mouse, remote control, etc.). When a user wants to access the third-party application, the user may provide an audible command representing a request to open or otherwise view content of the application. The audio corresponding to the audible command may be captured by a microphone of the user device or an accessory device, which may generate corresponding audio data. The audio data may be sent to a remote system, which may determine an intent associated with the audio data. Here, the intent may be to open or otherwise display content of a requested third-party application. Once displayed, the user may desire to interact with the displayed content through audio input means.

The user device and/or the accessory device may determine that content of the third-party application is being displayed on the user device. Data indicating that content of the third-party application is being displayed and/or indicating an identifier of the application may be sent to a remote system. The remote system may determine whether the application is authorized for voice controlling content based at least in part on an indication that the developer or other party responsible for the application has indicated that the application may be voice enabled. In examples where the data indicates that the application may be voice enabled, components of the user device and/or the accessory device may query or otherwise receive context information, also described herein as screen data, corresponding to the content displayed on the user device. Examples of context information may include indications of objects that are displayed on the user device and/or information indicating relationship between objects. This information may be sent to the remote system and may be utilized to identify which portions of the content may be selected and/or interacted with by the user and/or possible actions that may be taken with respect to those objects.

Continuing with the example above, the user may provide a voice command to interact with the content displayed on the user device. The microphone of the user device and/or the accessory device may capture audio corresponding to the voice command and may generate corresponding audio data. The audio data may be sent to the remote system, which may perform automatic speech recognition on the audio data to generate corresponding text data. The remote system may utilize natural language understanding techniques based on the text data to determine one or more intents that correspond to the voice command. The remote system may perform named entity recognition in connection with the natural language understanding to identify portions of the text data that correspond to a named entity that may be recognizable by the remote system. The process may link a text portion to a specific entity known to the remote system. To perform named entity resolution, the remote system may utilize the context information provided by the user device and/or the accessory device. The context information may be used for entity resolution, for example, by matching results of the automatic speech recognition components with different entities, such as types of objects displayed on the user device. In this way, a data source database of the remote system may be populated with some or all of the context information provided by the user device and/or the accessory device to assist in named entity recognition.

Based at least in part on an indication that content of the third-party application is displayed on the user device and/or on receipt of the context information, a speechlet of the remote system configured to assist in voice controlling third-party applications may be called and data representing the results of the natural language understanding techniques may be sent to the speechlet for processing. The speechlet may generate directive data corresponding to a directive based at least in part on the intent determined by the natural language understanding component and any values associated with that intent. The directive data may include data indicating that an action is to be taken with respect to one or more portions of the content displayed on the device.

The directive data may be sent to the user device and/or the accessory device, which may determine an action to take with respect to the content based at least in part on the directive data. A node processing component of the user device and/or the accessory device may receive data corresponding to the action and the object on which the action is to be applied and may attempt to perform the action on a node corresponding to the object. This process may include matching searchable text associated with the directive to text associated with the nodes of the content displayed on the device. A confidence map may be applied over the nodes and the node having the highest confidence that the action is to be performed thereon may be selected. The action may be performed on the selected node. In this way, the user's voice command may be utilized to interact with content of the third-party application, even when the third-party application has not been configured to control displayed content or the computing device via voice commands.

Additionally, or alternatively, the user device, accessory device, and/or the remote system may assist in utilizing user utterances to interact with the third-party application by generating and/or causing display of tips for the user to follow. For example, utilizing the context information indicating the objects displayed on the screen, overlay content may be generated that provides numbers and/or letters, for example, associated with the displayed objects. As described herein, the overlay content may be described as including "hints" for user interaction with the system. The user, seeing the overlay content, may then provide a voice command that instructs the system to perform an action on a selected number and/or letter. By so doing, a confidence at which the system determines which action to perform from the voice command may be increased. Additionally, or alternatively, in examples where multiple objects displayed on the user device correspond to the same or similar actions, the system may identify the relationship between the objects and may generate a modified hint, which may simplify user interaction with the system.

Additionally, or alternatively, the system may be configured to identify and/or determine when the content displayed on the user device changes. For example, when a user interacts with the content displayed on the user device, the action performed with respect to the content may cause the content to be updated and/or for different content to be displayed. The user device and/or the accessory device may be configured to identify content-change events and may send updated context information to the remote system based at least in part on the content-change event. The updated context information may inform the natural language understanding, including the named entity recognition, and/or the directive generation for subsequent voice commands.

Additionally, or alternatively, the system may be configured to rank directive data and/or actions in examples where a determined intent corresponds to more than one action to be performed on a given object. For example, the user utterance may represent an intent that may be determined to correspond to more than one action and/or that may correspond to an action that may be performed with respect to multiple objects. In these examples, the directive data and/or actions may be ranked such that an ambiguous utterance may result in highest-ranked directive data being sent to the user device and/or a highest-ranked action being selected. Ranking of directive data and/or actions may be based at least in part on historical use data, the application associated with the displayed content, location of objects with respect to each other as displayed on the user device, categorization of intents, previous voice commands, and/or context information updating, for example.

The present disclosure provides an overall understanding of the principles of the structure, function, manufacture, and use of the systems and methods disclosed herein. One or more examples of the present disclosure are illustrated in the accompanying drawings. Those of ordinary skill in the art will understand that the systems and methods specifically described herein and illustrated in the accompanying drawings are non-limiting embodiments. The features illustrated or described in connection with one embodiment may be combined with the features of other embodiments, including as between systems and methods. Such modifications and variations are intended to be included within the scope of the appended claims.

Additional details are described below with reference to several example embodiments.

FIG. 1 illustrates a schematic diagram of an example system 100 for voice control of computing devices. The system 100 may include, for example, a user device 102 and one or more accessory devices 104(a)-(b). The user device 102 may include a display 106, which may be configured to display content associated with one or more third-party applications. As shown in FIG. 1, the user device 102 is a television. It should be understood that while a television is used herein as an example user device 102, other devices that display content, such as, for example, a tablet, a mobile phone, a projector, a computer, and/or other computing devices are included in this disclosure. In examples, the system 100 may include one or more accessory devices 104(a)-(b). The accessory device 104(a)-(b) may be computing devices configured to communicate with each other, with the user device 102, and/or with a remote system 108 via a network 110. It should be understood that some or all of the operations described herein as being performed with respect to the user device 102 may additionally, or alternatively, be performed with respect to one or more of the accessory devices 104(a)-(b). It should also be understood that some or all of the operations described herein as being performed with respect to the one or more accessory devices 104(a)-(b) may be performed by the user device 102.

The user device 102 and/or the accessory devices 104(a)-(b) may include, for example, one or more processors 112, one or more network interfaces 114, one or more speakers 116, one or more microphones 118, one or more displays 106, and memory 120. The components of the user device 102 and/or the accessory devices 104(a)-(b) are described in more detail below. The remote system 108 may include, for example, one or more processors 122, one or more network interfaces 124, and memory 126. The components of the remote system are also described in more detail below.

By way of example, the microphones 118 of the user device 102 and/or the accessory devices 104(a)-(b) may be configured to capture audio representing one or more voice commands from a user located in an environment associated with the user device 102 and/or the accessory devices 104(a)-(b). The microphones 118 may be further configured to generate audio data corresponding to the captured audio. The speakers 116 may be configured to receive audio data from other components of the user device 102 and/or the accessory devices 104(a)-(b) and/or the remote system 108. The speakers 116 may be further configured to output audio corresponding to the audio data. The displays 106 may be configured to present renderings of content associated with an application, such as a third-party application.

As used herein, a processor, such as processor(s) 112 and/or 122, may include multiple processors and/or a processor having multiple cores. Further, the processors may comprise one or more cores of different types. For example, the processors may include application processor units, graphic processing units, and so forth. In one implementation, the processor may comprise a microcontroller and/or a microprocessor. The processor(s) 112 and/or 122 may include a graphics processing unit (GPU), a microprocessor, a digital signal processor or other processing units or components known in the art. Alternatively, or in addition, the functionally described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) 112 and/or 122 may possess its own local memory, which also may store program components, program data, and/or one or more operating systems.

The memory 120 and/or 126 may include volatile and nonvolatile memory, removable and non-removable media implemented in any method or technology for storage of information, such as computer-readable instructions, data structures, program component, or other data. Such memory 120 and/or 126 includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The memory 120 and/or 126 may be implemented as computer-readable storage media ("CRSM"), which may be any available physical media accessible by the processor(s) 112 and/or 122 to execute instructions stored on the memory 120 and/or 126. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which can be used to store the desired information and which can be accessed by the processor(s).

Further, functional components may be stored in the respective memories, or the same functionality may alternatively be implemented in hardware, firmware, application specific integrated circuits, field programmable gate arrays, or as a system on a chip (SoC). In addition, while not illustrated, each respective memory, such as memory 120 and/or 126, discussed herein may include at least one operating system (OS) component that is configured to manage hardware resource devices such as the network interface(s), the I/O devices of the respective apparatuses, and so forth, and provide various services to applications or components executing on the processors. Such OS component may implement a variant of the FreeBSD operating system as promulgated by the FreeBSD Project; other UNIX or UNIX-like variants; a variation of the Linux operating system as promulgated by Linus Torvalds; the FireOS operating system from Amazon.com Inc. of Seattle, Wash., USA; the Windows operating system from Microsoft Corporation of Redmond, Wash., USA; LynxOS as promulgated by Lynx Software Technologies, Inc. of San Jose, Calif.; Operating System Embedded (Enea OSE) as promulgated by ENEA AB of Sweden; and so forth.

The network interface(s) 114 and/or 124 may enable communications between the components and/or devices shown in system 100 and/or with one or more other remote systems, as well as other networked devices. Such network interface(s) 114 and/or 124 may include one or more network interface controllers (NICs) or other types of transceiver devices to send and receive communications over the network 110.

For instance, each of the network interface(s) 114 and/or 124 may include a personal area network (PAN) component to enable communications over one or more short-range wireless communication channels. For instance, the PAN component may enable communications compliant with at least one of the following standards IEEE 802.15.4 (ZigBee), IEEE 802.15.1 (Bluetooth), IEEE 802.11 (WiFi), or any other PAN communication protocol. Furthermore, each of the network interface(s) 114 and/or 124 may include a wide area network (WAN) component to enable communication over a wide area network.

In some instances, the remote system 108 may be local to an environment associated the user devices 102 and/or the accessory devices 104(a)-(b). For instance, the remote system 108 may be located within the user devices 102 and/or the accessory devices 104(a)-(b). In some instances, some or all of the functionality of the remote system 108 may be performed by one or more of the user devices 102 and/or the accessory devices 104(a)-(b).

The memory of the user device 102 and/or the accessory devices 104(a)-(b) may include computer-executable instructions, described below as components of the memory 120, that when executed by the one or more processors 112 may cause the one or more processors 112 to perform various operations. Exemplary components of the memory 120 of the user device 102 and/or the accessory devices 104(a)-(b) may include a third-party application storage and/or access component 128, a device event controller 130, a directive handler 132, a node processing component 134, a keyword processing component 136, a third-party application interface component 138, a ranking component 140, and/or an overlay component 142. Each of these exemplary components of the memory 120 are described below.

The memory 126 of the remote system 108 may include computer-executable instructions, described below as components of the memory 126, that when executed by the one or more processors 122 may cause the one or more processors 122 to perform various operations. Exemplary components of the memory 126 of the remote system 108 may include a user profile and/or account component 144, an automatic speech recognition component 146, a natural language understanding component 148, one or more speechlets 150, a third-party application registry 152, and/or a ranking component 154. Each of these exemplary components of the memory 126 are described below.

The user profile/account component 144 of the memory 126 may be configured to store associations between users, user profiles, user accounts, user devices, accessory devices, the remote system, and/or third-party applications. In this way, data sent from user device and/or accessory devices may be associated with voice commands and/or applications to which voice commands are directed. It should be understood that a given user profile may be associated with one or more applications and/or one or more devices, and that a given user account may be associated with one or more than one user profile.

For purposes of describing, in more detail, the components of the memory 120 and/or the memory 126, functionality of the memory 120 and/or the memory 126 will be described with respect to an example voice command and the process of controlling the user device 102 based on that voice command.

With respect to the third-party application storage and/or access component 128, it may be configured to store third-party applications that have been downloaded onto the memory 120 of the user device 102 and/or the accessory devices 104(*a*)-(*b*). Additionally, or alternatively, the third-party application storage and/or access component 128 may be configured to access third-party applications that the user device 102 and/or the accessory devices 104(*a*)-(*b*) have been authorized to use. Additionally, or alternatively, the third-party application storage and/or access component 128 may be configured to store and/or access context information, also described as screen data, associated with the third-party applications, such as document object model (DOM) information.

The third-party application interface component 138 may be configured to receive data indicating the identity of the application corresponding to the content being displayed on the user device 102. The third-party application interface component 138 may be further configured to receive screen data associated with the content displayed on the user device 102. The data indicating the identity of the application may be sent, via the network 110, to the remote system 108. Additionally, the screen data may be sent, via the network 110, to the remote system 108. The screen data may include DOM information associated with the content. The DOM information may include identification of one or more objects corresponding to the displayed content and/or one or more relationships between the objects.

The DOM may be an application programming interface (API) that represents hypertext markup language (HTML), extensible markup language (XML), and/or other computing languages in a tree structure where each node of the tree represents an object representing part of the application code. When an object is acted upon in the tree, corresponding changes may be reflected in the display of content of the application. One or more libraries associated with the API may be provided to allow one or more actions to be taken with respect to the nodes in the DOM tree.

Based at least in part on receiving the data indicating that content associated with a third-party application is displayed on the user device 102, the third-party application registry 152 may determine whether the third-party application is registered or otherwise authorized to provide voice control of the content displayed on the user device 102. For example, when a third-party application developer publishes an application for sale or consumption on an application store, the developer may be queried to determine whether the developer would like to voice enable the application. If the developer indicates that voice enablement is authorized, an indication of the application may be stored in the third-party application registry. Thereafter, when data indicating that content of the application is being displayed on a device, audio data corresponding to voice commands may be processed to voice enable the application.

To illustrate additional functionality of the memory 120 and/or 126, an example of a user providing a voice command to interact with the displayed content is provided herein. The user may provide an audible voice command, which may be captured by the microphones 118. The microphones 118 may generate corresponding audio data, which may be sent, via the network 110, to the remote system 108.

The automatic speech recognition (ASR) component 146 may receive the audio data and may generate corresponding text data. Performing ASR is described in more detail below with respect to FIG. 12. The natural language understanding (NLU) component 148 may receive the text data generated by the ASR component 146 and may determine an intent associated with the voice command. Performing NLU is described in more detail below with respect to FIG. 12. The NLU component 148, as part of determining the intent associated with the voice command, may perform named entity recognition in connection with the natural language understanding to identify portions of the text data that correspond to a named entity that may be recognizable by the remote system 108. The process may link a text portion to a specific entity known to the remote system 108.

To perform named entity recognition, the remote system may utilize the screen data provided by the third-party application interface component 138 of the user device 102 and/or the accessory devices 104(*a*)-(*b*). The screen data may be used for entity recognition, for example, by matching results of the automatic speech recognition components with different entities associated with the application, such as objects displayed on the user device 102. In this way, a data source database may be populated with some or all of the screen data provided by the user device 102 and/or the accessory device 104(*a*)-(*b*) to assist in named entity recognition. In this way, the NLU component 148 may be trained or otherwise configured to select an intent based on the screen data that is currently being displayed on the user device 102. Additionally, the NLU component 148 may determine a value for one or more slots associated with the intent based on the screen data.

For example, a user viewing content associated with a video-playing application may provide a user command to "play the cat video." Based at least in part on the indication that content of the third-party application is being displayed on the user device 102, screen data indicating the objects being displayed may be sent to and received by the NLU component 148. The screen data may include an indication of one or more intents that may be specific to the application being utilized by the user and/or an indication of the objects currently being displayed. In the example of the video-playing application, the objects may include one or more play buttons, selectable text associated with videos, video categories, and/or text-input fields, for example. The intents may include, for example, playing video, selecting an object, and/or performing a keyword search. The NLU component 148 may be configured to determine the intent that corresponds to the voice command and determine one or more values to fill with slots associated with the intent. For example, the determined intent may be "play," and the value that may fill the slot associated with that intent may be "cat video." The determination of intent and slot values may be based at least in part on a personalized finite state transducer to improve intent determination and slot value determination.

Based at least in part on an indication that the application associated with the displayed content has been authorized for voice enablement utilizing the system described herein, the remote system 108 may send data corresponding to the intent and value(s) associated therewith to a speechlet 150 configured to generate directives for third-party applications. The speechlet 150 may generate the directive for the user device 102 to perform based at least in part on the information received from the NLU component 148. Some or all of the screen data associated with the displayed content may be provided by the third-party application interface component 138 of the user device 102 and/or the accessory devices 104(a)-(b). The screen data may be utilized to generate a directive for the user device 102 and/or the accessory devices 104(a)-(b) to be performed that effectuates the intent determined by the NLU component 148.

In examples, the ranking component 154 may be configured to rank directives in examples where a determined intent corresponds to more than one action to be performed on a given object. For example, the voice command may represent an intent that may be determined to correspond to more than one action and/or that may correspond to an action that may be performed with respect to multiple objects. In these examples, the directives may be ranked such that an ambiguous voice command may result in a highest-ranked directive being sent to the user device 102. Ranking of directives may be based at least in part on historical use data, the application associated with the displayed content, location of objects with respect to each other as displayed on the user device, categorization of intents, previous voice commands, and/or screen data updating.

For example, historical use data may indicate that a given voice command, while corresponding to multiple directives, historically corresponds to a first directive more frequently than a second directive with respect to voice commands received via the user device 102. Additionally, or alternatively, data indicating that a given voice command, while corresponding to multiple directives, historically corresponds to a first directive more frequently than a second directive with respect to voice commands received via the user device 102 and/or other devices may be used. The application may also provide an indication of which directives are to be prioritized more than other directives. Additionally, or alternatively, data indicating the location of objects with respect to each other as displayed on the user device 102 may be utilized to rank directives. For example, directives to perform actions on objects that are displayed more prominently may be prioritized more than directives to perform actions on objects that are displayed less prominently. Additionally, or alternatively, certain intents may not be dependent on a specific object displayed on the user device 102 and therefore may be associated with a predetermined directive. For example, a voice command of "scroll down" may correspond to an intent to display content that is not currently in view on the user device 102 and may not correspond to an intent to perform an action with respect to an object displayed on the user device 102. Directives to perform actions based on intents such as this that are not object dependent may be prioritized over directives to perform actions that are object dependent.

Additionally, or alternatively, data indicating previous voice commands may be utilized to rank directives. For example, a previous voice command may be "scroll down" and a subsequent voice command may be "more." Without contextual data indicating the previous voice command, the command of "more" could correspond to directives to perform actions such as showing more videos, providing more information about a certain video, playing more of a video, etc. However, utilizing the previous voice command of "scroll down," the directives may be ranked such that a directive to perform an additional scroll down action is prioritized over other directives. Additionally, or alternatively, data indicating that the screen data has changed or has otherwise been updated may be utilized to rank directives.

Additionally, or alternatively, a predetermined prioritization of directives may be stored and utilized by the remote system 108. For example, directives to perform actions on objects associated with the application may be ranked based at least in part on the type of object being acted on. For example, objects associated with both an image and text may be prioritized over objects with just text, just an image, selectable text, and/or editable text. For example, a voice command of "play video" may be associated with directives to perform actions on various objects, such as an image representing a video with a play icon overlaid thereon, text that reads "play," a play icon, and/or an editable field such as a search field to which the phrase "play video" may be inserted. In this example, the directive associated with the image and overlaid play icon may be prioritized over the other directives. Likewise, the play icon may be prioritized over the text that reads "play." Likewise, the text that reads "play" may be prioritized over the editable field. The ranking of directives may be based at least in part on the intent determined by the NLU component 148. For example, a determined intent of "play" may correspond to a ranking as discussed above. Additionally, or alternatively, a determined intent of "search for" may correspond to a ranking that prioritizes directives to perform actions on objects associated with editable fields over directives to perform actions on objects associated with selection of objects. Additionally, or alternatively, a determined intent of "select" may correspond to a ranking that prioritizes directives to perform actions on objects that, when selected, cause the content to be updated over directives to perform actions on other objects, such as inserting text into a search field. It should be understood that the examples of directive ranking are provided herein for illustration, and other examples of ranking directives are included in this disclosure.

Once a directive is generated by the speechlet 150, the remote system 108 may send, via the network 110, data representing the directive to the user device 102 and/or the accessory devices 104(a)-(b). The directive handler 132 of the memory 120 may receive the directive and may determine an action to be performed based at least in part on the directive. For example, the directive may indicate that a "play" intent is to be performed on the object "cat video." The directive handler 132, based at least in part on the intent from the directive, may determine that the action of causing a video to be played on the user device 102 is to be taken. The directive handler 132 may also determine that the action of causing a video to be played is associated with a "cat video."

The directive handler 132 may send data to the device event controller 130 indicating the selected action to be performed along with the value of "cat video" associated therewith. The device event controller 130 may then determine which components of the user device 102 and/or accessory devices 104(a)-(b) are to be utilized to perform the action determined by the directive handler 132. The device event controller 130 may be further configured to identify and/or determine when an event occurs that corresponds to displayed content changing and/or being updated. Examples of such an event may include initiating an application, a user interaction with the content that causes the content to be updated, a refresh of the content, and/or time-dependent changes to the displayed content. The device event controller 130, based at least in part on identifying and/or determining that an event has occurred, may cause the third-party application interface component 138 to identify and/or determine updated content being displayed on the user device 102.

The node processing component 134 may receive data from the device event controller 130 indicating the action to be performed and the objects on which the action is to be performed. The node processing component 134 may identify node information stored by the third-party application storage/access component 128 and/or as determined by the third-party application interface component 138. The node processing component 134 may attempt to match or substantially match the identified object from the directive to a node associated with the application. This process may be performed using a keyword search, where the keyword(s) used in the search may be words used to describe the object. For example, an object may include or be associated with displayed text that reads "Best cat video." This phrase may be utilized in a keyword search of searchable text associated with nodes of the application. The node that matches or best matches the searched-for phrase may be selected as the node on which the action is to be performed. Keeping with the example used herein, a node associated with a video with the description of "Best cat video on earth" may be determined to be the best match for "best cat video." The action of causing the video to be played may be performed on the selected node. The keyword processing component 136 may be utilized to return a list of searchable words with stop words, such as "and," "of," and/or "the" filtered out. This information may be utilized to match the keywords to the proper node.

In examples, the directive received from the remote system 108 may be associated with more than one action. For example, a "select" intent may correspond to opening a hyperlink, causing a video to play, causing additional information to be displayed, or other actions. The ranking component 140 of the memory 120 may be configured to prioritize actions based at least in part on the intent from the directive and/or contextual information associated with the application. For example, historical use data may indicate that a given intent, while corresponding to multiple actions, historically corresponds to a first action more frequently than a second action with respect to intents received via the user device 102. Additionally, or alternatively, data indicating that a given intent, while corresponding to multiple actions, historically corresponds to a first action more frequently than a second action with respect to voice commands received via the user device 102 and/or other devices may be used. The application may also provide an indication of which actions are to be prioritized more than other actions.

Additionally, or alternatively, data indicating the location of objects with respect to each other as displayed on the user device 102 may be utilized to rank actions. For example, actions to be performed on objects that are displayed more prominently may be prioritized more than actions to be performed on objects that are displayed less prominently. Additionally, or alternatively, certain intents may not be dependent on a specific object displayed on the user device 102 and therefore may be associated with a predetermined action. For example, a voice command of "scroll down" may correspond to an intent to display content that is not currently in view on the user device 102 and may not correspond to an intent to perform an action with respect to an object displayed on the user device 102. Actions based on intents such as this that are not object dependent may be prioritized over actions that are object dependent.

Additionally, or alternatively, data indicating previous voice commands may be utilized to rank actions. For example, a previous voice command may be "scroll down" and a subsequent voice command may be "more." Without contextual data indicating the previous voice command, the command of "more" could correspond to actions such as showing more videos, providing more information about a certain video, playing more of a video, etc. However, utilizing the previous voice command of "scroll down," the actions may be ranked such that an action to perform an additional scroll down is prioritized over other actions. Additionally, or alternatively, data indicating that the screen data has changed or otherwise been updated may be utilized to rank actions. Additionally, or alternatively, a predetermined prioritization of actions may be stored and utilized by the remote system 108. It should be understood that the examples of action ranking are provided herein for illustration, and other examples of ranking actions are included in this disclosure.

The overlay component 142 may be configured to provide one or more "hints" to assist a user with providing a voice command and/or determining an intent from the voice command with more accuracy. For example, utilizing the screen data indicating the objects displayed on the screen, overlay content may be generated that provides numbers and/or letters, for example, associated with the displayed objects. As described herein, the overlay content may be described as including "hints" for user interaction with the system. The user, seeing the overlay content, may then provide a voice command that instructs the system to perform an action on a selected number and/or letter. For example, the user may provide the voice command of "select number 1." By so doing, a confidence at which the system determines which action to perform from the voice command may be increased. Additionally, or alternatively, in examples where multiple objects displayed on the user device correspond to the same or similar actions, the system may identify the relationship between the objects and may generate a modified hint, which may simplify user interaction with the system.

Figure 2:
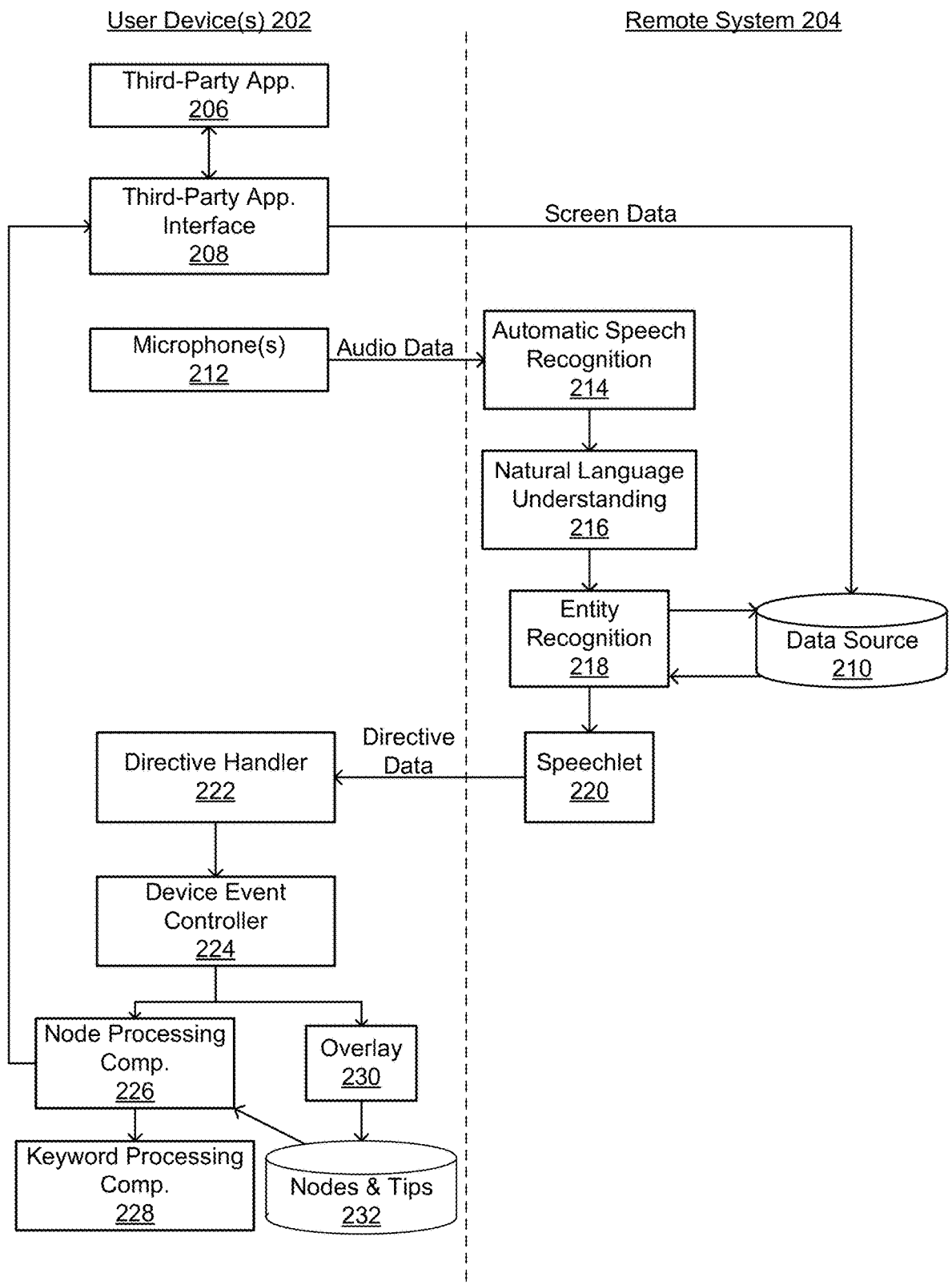
FIG. 2 illustrates a conceptual diagram of components of a user device and a remote system involved in controlling computing devices via audible input.

FIG. 2 illustrates a conceptual diagram of components of a user device 202 and a remote system 204 involved in controlling computing devices via audible input. The components of the user device 202 and the remote system 204 are described with respect to FIG. 2 along with an example flow of how each component may interact with each other and how information may be identified, determined, generated, sent, and/or received by each component of the system.

For example, a third-party application 206 may be stored in memory of the user device 202 and/or may be accessed by the user device 202. The third-party application 206 may include an identifier of the application 206 along with data representing the content associated with the application 206. The content may be described in terms of nodes of a DOM tree, which may be utilized to perform actions on the content. As described herein, objects may be displayed on the user device 202. The objects may correspond to one or more nodes of the DOM tree of the application 206.

The third-party application interface component 208 may receive the data described above from the third-party application 206 and/or one or more databases storing this data. For example, the third-party application interface component 208 may be configured to receive data indicating the identity of the application 206 corresponding to the content being displayed on the user device 202. The third-party application interface component 208 may be further configured to receive screen data associated with the content displayed on the user device 202. The data indicating the identity of the application 206 may be sent, via a network, to the remote system 204. Additionally, the screen data may be sent, via the network, to the remote system 204. The screen data may include DOM information associated with the content. The DOM information may include identification of one or more objects corresponding to the displayed content and/or one or more relationships between the objects.

The DOM may be an application programming interface (API) that represents hypertext markup language (HTML), extensible markup language (XML), and/or other computing languages in a tree structure where each node of the tree represents an object representing part of the application. When an object is acted upon in the tree, corresponding changes may be reflected in the display of content of the application. One or more libraries associated with the API may be provided to allow one or more actions to be taken with respect to the nodes in the DOM tree. Additionally, or alternatively, the context data may be described as and/or be associated with metadata associated with the application. The metadata may provide an indication as to which portions of the content, and/or renderings of the portions of the content, correspond to selectable objects. For example, the metadata may indicate that a certain portion of the content is associated with a link that, when selected by a user, causes the content displayed by the device to be updated. Syntax associated with portions of the content may indicate that selection of the portion of the content results in the fetching of data, querying of a database, receipt of content, and/or other actions that, when executed, would cause the content displayed by the device to be updated. For example, a portion of the content corresponding to "movies" in a video-playing application may be associated with metadata and/or other contextual information that may indicate that a selection of a rendering of the "movies" portion of the content results in the application fetching data indicating movies available to watch using the application and displaying indicators of the various movies. Given that the "movies" portion of the content corresponds to a selectable portion of the content, this portion of the content may be identified as an object on which a user may interact via user utterances.

Based at least in part on receiving the data indicating that content associated with a third-party application 206 is displayed on the user device 202, a third-party application registry of the remote system 204 may determine whether the third-party application 206 is registered or otherwise authorized to provide voice control of the content displayed on the user device 202. For example, when a third-party application developer publishes an application for sale or consumption on an application store, the developer may be queried by the application store to determine whether the developer would like to voice enable the application. If the developer indicates that voice enablement is authorized, an indication of the application may be stored in the third-party application registry. Thereafter, when data indicating that content of the application is being displayed on a device, audio data corresponding to voice commands may be processed to voice enable the application.

The context data identified, determined, and/or generated by the third-party application interface component 208 may be sent to the remote system 204 and may be stored, for example, in a data store database 210. This context data may be utilized by the remote system 204 as described more fully below.

The user device 202 may have one or more microphones 212 that may be configured to capture audio from the environment in which the user device 202 is disposed. As described herein, an example of audio from the environment may be a human utterance, such as a voice command to interact with content displayed by the user device 202. Additionally, or alternatively, an accessory device, such as the accessory devices 104(a)-(b) from FIG. 1 may include the microphones 212. The microphones 212 may generate audio data corresponding to the audio. The user device 202 may send the audio data, or a portion thereof, to the remote system 204.

The automatic speech recognition (ASR) component 214 of the remote system 204 may receive the audio data and may perform ASR thereon to generate text data. Performing ASR on the audio data is described more fully below with respect to FIG. 12. The text data may be utilized by the natural language understanding (NLU) component 216 to determine one or more intents associated with the voice command. Again, performing NLU on the text data is described more fully below with respect to FIG. 12. The NLU component 216, as part of determining the intent associated with the voice command, may perform named entity recognition in connection with the natural language understanding to identify portions of the text data that correspond to a named entity that may be recognizable by the remote system 204. The process may link a text portion to a specific entity known to the remote system 204. As shown in FIG. 2, the entity recognition component 218 is shown as a separate component from the NLU component 216. However, it should be understood that the entity recognition component 218 may be a component of the NLU component 216.

To perform named entity recognition, the entity recognition component 218 may utilize the screen data provided by the third-party application interface component 208 of the user device 202. The screen data may be used for entity recognition, for example, by matching results of the ASR component 214 with different entities associated with the application 206, such as objects displayed on the user device 202. In this way, the data source database 210 may be populated with some or all of the screen data provided by the user device 202 to assist in named entity recognition. The NLU component 218 may be trained or otherwise configured to select an intent based on the screen data that is currently being displayed on the user device 202. Additionally, the NLU component 218 may determine a value for one or more slots associated with the intent based on the screen data.

The intent determined by the NLU component 216, with, in examples, assistance from the entity recognition component 218, may be sent to a speechlet 220 configured to generate directives to perform actions with respect to the third-party application 206. Based at least in part on an indication that the application 206 has been authorized for voice enablement utilizing the system described herein, the intent and associated value(s) may be sent to the speechlet 220 configured to generate directive data for the third-party application 206. The speechlet 220 may generate the directive data for the user device 202 to perform based at least in part on the information received from the NLU component 216 and/or the entity recognition component 218. Some or all of the screen data associated with the displayed content may be provided by the third-party application interface component 208. The screen data may be utilized to generate directive data for the user device 202 and/or one or more the accessory devices to be performed that effectuates the intent determined by the NLU component 216.

Once directive data is generated by the speechlet 220, the remote system 204 may send, via the network, the directive data to the user device 202. The directive handler 222 of the user device 202 may receive the directive data and may determine an action to be performed based at least in part on the directive data. For example, the directive data may indicate that a "play" intent is to be performed on the object "cat video." The directive handler 222, based at least in part on the intent from the directive data, may determine that the action of causing a video to be played on the user device 202 is to be taken. The directive handler 222 may also determine that the action of causing a video to be played is associated with a "cat video."

The directive handler 222 may send data to a device event controller 224 indicating the selected action to be performed along with the value of "cat video" associated therewith. The device event controller 224 may then determine which components of the user device 202 are to be utilized to perform the action determined by the directive handler 222. The device event controller 224 may be further configured to identify and/or determine when an event occurs that corresponds to displayed content changing and/or being updated. Examples of such an event may include initiating an application, a user interaction with the content that causes the content to be updated, a refresh of the content, and/or time-dependent changes to the displayed content. The device event controller 224, based at least in part on identifying and/or determining that an event has occurred, may cause the third-party application interface component 208 to identify and/or determine updated content being displayed on the user device 202.

The node processing component 226 may receive data from the device event controller 224 indicating the action to be performed and the objects on which the action is to be performed. The node processing component 226 may identify stored node information, which may be determined by the third-party application interface component 208. The node processing component 226 may attempt to match or substantially match the identified object from the directive to a node associated with the application 206. This process may be performed using a keyword search, where the keyword(s) used in the search may be words used to describe the object. For example, an object may include or be associated with displayed text that reads "Best cat video." This phrase may be utilized in a keyword search of searching text associated with nodes of the application 206. The node that matches or best matches the searched-for phrase may be selected as the node on which the action is to be performed. Keeping with the example used herein, a node associated with a video with the description of "Best cat video on earth" may be determined to be the best match for "best cat video." The action of causing the video to be played may be performed on the selected node. A keyword processing component 228 may be utilized to return a list of searchable words with stop words, such as "and," "of," and/or "the" filtered out. This information may be utilized to match the keywords to the proper node.

The overlay component 230 may be configured to provide one or more "hints" to assist a user with providing a voice command and/or determining an intent from the voice command with more accuracy. For example, utilizing the screen data indicating the objects displayed on the screen, overlay content may be generated that provides numbers and/or letters, for example, associated with the displayed objects. Information associated with the hints, also described as tips, may be stored in a nodes-and-tips database 232. Associations between hints, hint identifiers, and associations between nodes and hints may also be stored in the nodes-and-tips database 232. The information stored in the nodes-and-tips database 232 may be utilized by the overlay component 230 to generate the overlay content. The user, seeing the overlay content, may then provide a voice command that instructs the system to perform an action on a selected number and/or letter. For example, the user may provide the voice command of "select number 1." By so doing, a confidence at which the system determines which action to perform from the voice command may be increased. Additionally, or alternatively, in examples where multiple objects displayed on the user device correspond to the same or similar actions, the system may identify the relationship between the objects and may generate a modified hint, which may simplify user interaction with the system.

The node processing component 226 may send data indicating the action to be performed and the node(s) on which the action is to be performed to the third-party application interface component 208. The third-party application interface component 208 may send data to the third-party application 206 and/or to other components of the user device 202 to cause the action to be performed on the node(s).

Figure 3:
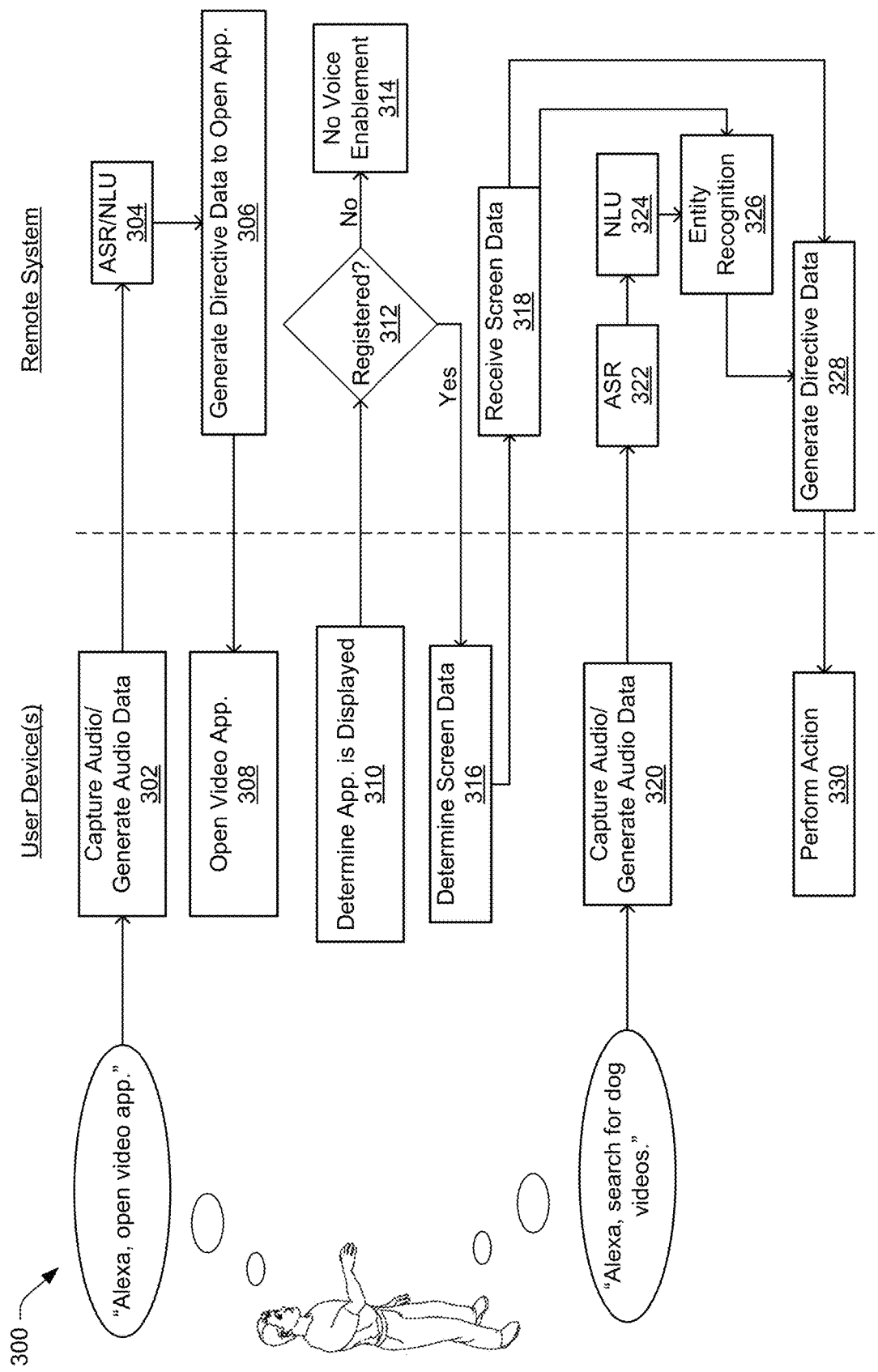
FIG. 3 illustrates a flow diagram of an example process for controlling computing devices via audible input.

FIG. 3 illustrates a flow diagram of an example process 300 for controlling computing devices via audible input. The operations of the process 300 are described with respect to the user device and/or the remote system, as illustrated by FIG. 3. The order in which the operations or steps are described is not intended to be construed as a limitation, and any number of the described operations may be combined in any order and/or in parallel to implement process 300.

At block 302, the process 300 may include capturing audio from an environment in which the user device is disposed and generating corresponding audio data. For example, the audio may include a voice command from a user in the environment. As shown in FIG. 3, the voice command is "Alexa, open video app." Audio corresponding to this voice command may be captured by one or more microphones of the user device and/or an accessory device, and the corresponding audio data may be generated and sent to the remote system.

At block 304, the process 300 may include performing automatic speech recognition (ASR) on the audio data to generate corresponding text data. Natural language understanding (NLU) techniques may be performed on the text data to determine an intent associated with the voice command. ASR and NLU techniques are described in more detail below with respect to FIG. 12. In the example using in FIG. 3, the voice command "Alexa, open video app" may correspond to an "open application" intent, and the value indicating which application to open may correspond to "video." Based at least in part on determining that the voice command corresponds to the intent to open the video application, at block 306, the process 300 may include generating directive data to open the application. The directive data may be sent to the user device and/or an accessory device, which may, at block 308, open the video application based at least in part on receiving data corresponding to the directive from the remote system.

At block 310, the process 300 may include determining that content associated with the application is currently being displayed on a display associated with the user device. It should be understood that the operations described with respect to block 310 may be performed irrespective of whether the operations described with respect to blocks 302-308 are performed. For example, a user may provide a tactile input that may cause an application to open or otherwise initiate. Determining that the application is currently being displayed may include receiving data from the application and/or another system on which the application is stored indicating that the application is being utilized. Additionally, or alternatively, an event handler may receive an indication that an event corresponding to opening the application has occurred.

Based at least in part on determining that content of the application is currently being displayed, at block 312, the process may include determining whether the application is registered to be voice enabled. For example, when a third-party application developer publishes an application for sale or consumption on an application store, the developer may be queried by the application store to determine whether the developer would like to voice enable the application. If the developer indicates that voice enablement is authorized, an indication of the application may be stored in a registry. Thereafter, when data indicating that content of the application is being displayed on a device, audio data corresponding to voice commands may be processed to voice enable the application. If the application is not registered, then at block 314, the process 300 may include not performing operations to voice enable the application.

If the application is registered, then at block 316, the process 300 may include determining screen data associated with the displayed content. The screen data may include document object model (DOM) information associated with the content of the application. The DOM information may include identification of one or more objects corresponding to the displayed content and/or one or more relationships between the objects. The DOM may be an application programming interface (API) that represents hypertext markup language (HTML), extensible markup language (XML), and/or other computing languages in a tree structure where each node of the tree represents an object representing part of the application content. When an object is acted upon in the tree, corresponding changes may be reflected in the display of content of the application. One or more libraries associated with the API may be provided to allow one or more actions to be taken with respect to the nodes in the DOM tree. At block 318, the process 300 may include receiving data corresponding to the screen data at the remote system. The screen data may be utilized by the remote system in operations described in more detail below.

At block 320, the process may include capturing audio from the environment in which the user device is disposed and generating corresponding audio data. For example, the audio may include a voice command from a user to interact with displayed content. As shown in FIG. 3, the voice command is "Alexa, search for dog videos." Audio corresponding to this voice command may be captured by one or more microphones of the user device and/or an accessory device, and the corresponding audio data may be generated and sent to the remote system.

At block 322, the process 300 may include performing ASR on the audio data to generate corresponding text data. NLU techniques may be performed at block 324 on the text data to determine an intent associated with the voice command. ASR and NLU techniques are described in more detail below with respect to FIG. 12. In the example using in FIG. 3, the voice command "Alexa, search for dog videos" may correspond to a "search" intent, and the value indicating which content is to be searched for may correspond to "dog videos." As part of determining the intent associated with the voice command, named entity recognition may be performed at block 326 in connection with the natural language understanding to identify portions of the text data that correspond to a named entity that may be recognizable by the remote system. The process may link a text portion to a specific entity known to the remote system. As shown in FIG. 3, performing the entity recognition is shown as a separate operation from the NLU operations described at block 324. However, it should be understood that the entity recognition may be performed as part of the NLU operations described at block 324.

To perform named entity recognition, the screen data determined at block 316 may be utilized. The screen data may be used for entity recognition, for example, by matching results of the ASR operations with different entities associated with the application, such as objects displayed on the user device. In this way, a data source database may be populated with some or all of the screen data provided by the user device to assist in named entity recognition. The NLU component of the remote system may be trained or otherwise configured to select an intent based on the screen data corresponding to content that is currently being displayed on the user device. Additionally, the NLU component may determine a value for one or more slots associated with the intent based on the screen data.

The intent determined by the NLU component, with, in examples, assistance from the entity recognition operations, may be sent to a speechlet configured to generate directives to perform actions with respect to the third-party application. The speechlet may generate the directive data at block 328 for the user device to perform based at least in part on the intent determined at blocks 324 and 326. The screen data may be utilized to generate directive data for the user device and/or one or more the accessory devices to be performed that effectuates the determined intent.

Once directive data is generated by the speechlet, the remote system may send, via the network, data representing the directive to the user device. A directive handler of the user device may receive the directive and may determine an action to be performed based at least in part on the directive. The directive handler may send data to a device event controller indicating the selected action to be performed along with information about the object on which to perform the action. The device event controller may then determine which components of the user device are to be utilized to perform the action determined by the directive handler. The device event controller may be further configured to identify and/or determine when an event occurs that corresponds to displayed content changing and/or being updated. Examples of such an event may include initiating an application, a user interaction with the content that causes the content to be updated, a refresh of the content, and/or time-dependent changes to the displayed content.

A node processing component of the user device may receive data from the device event controller indicating the action to be performed and the objects on which the action is to be performed. The node processing component may identify stored node information. The node processing component may attempt to match or substantially match the identified object from the directive to a node associated with the application. This process may be performed using a keyword search, where the keyword(s) used in the search may be words used to describe the object. The node that matches or best matches the searched-for phrase may be selected as the node on which the action is to be performed. A keyword processing component of the user device may be utilized to return a list of searchable words with stop words, such as "and," "of," and/or "the" filtered out. This information may be utilized to match the keywords to the proper node. Having determined the node on which to perform an action and having determined the action to be performed, at block 330, the action may be performed on the node of the application.

Figure 4:
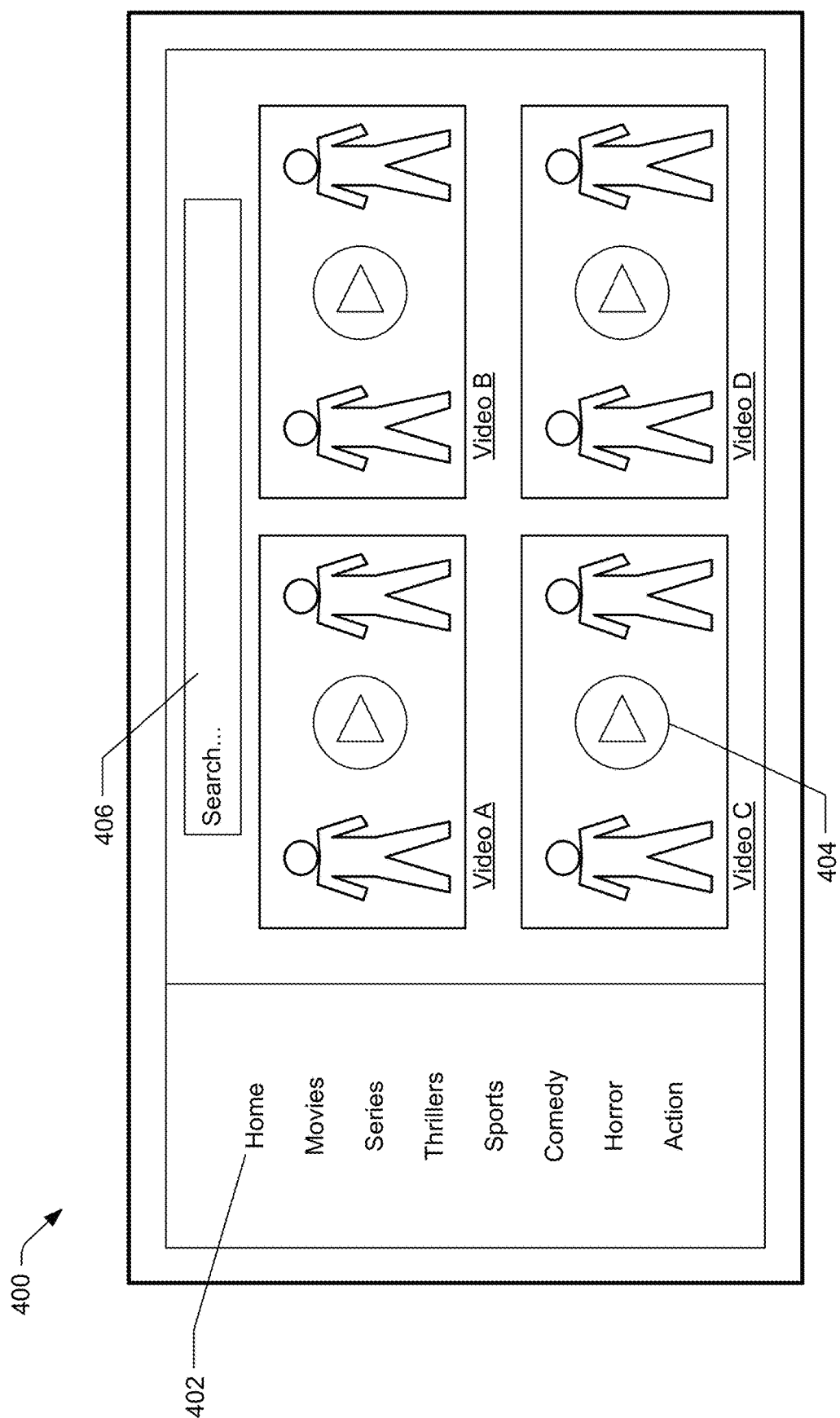
FIG. 4 illustrates an example user interface utilized for controlling computing devices via audible input.

FIG. 4 illustrates an example user interface 400 utilized for controlling computing devices via audible input. The user interface 400 may be displayed on a device, such as a user device 102 from FIG. 1. The user interface 400 may display content associated with an application, such as a third-party application. In the example provided with respect to FIG. 4, the third-party application is a video-playing application. It should be understood that while the example given with respect to FIG. 4 is a video-playing application, other applications that include objects that may be displayed on a device are included in this disclosure.

The user interface 400 may include one or more objects. The objects may be categorized into object types, such as text objects 402, image objects 404, and text-input objects 406. As described above, a user may interact with the various objects by audible input means. For example, a user may provide a voice command to open the video-playing application. The user may then provide subsequent voice commands to interact with the content displayed on the user device. Those voice commands may be, for example, "select movies," "play Video C," "search for dog videos," etc. Audio data corresponding to the voice commands may be processed as described above by a remote system to determine an intent associated with the voice commands. Directives to perform actions may be sent to the user device and/or an accessory device, which may utilize the directives to perform actions on nodes that correspond to the displayed objects. By way of example, a voice command to "select movies" may result in the "movies" object being selected as if the user had provided a tactile input of selecting the "movies" object displayed on the user device. By way of further example, a voice command to "play Video C" may result in the "Video C" text object 402 being selected, and/or the play icon overlaid on the image associated with "Video C" being selected, and/or the image associated with "Video C" being selected as if the user had provided a tactile input of selecting "Video C," the play icon, or the image displayed on the user device. By way of further example, a voice command to "search for dog videos" may result in the text-input object 406 being selected and the text "dog videos" being entered into the text-input field as if the user had provided a tactile input of selecting the text-input field and typed or otherwise input "dog videos" into the field.

Performing one or more of the actions on one or more of the objects described with respect to FIG. 4 may result in additional and/or different content being displayed on the user device. For example, selection of the "movies" object may result in a change in the images displayed on other portions of the user interface 400 such that images corresponding to videos identified as being in the category of "movies" are displayed. The text objects 402 corresponding to descriptions of the videos may also be updated to the descriptions that correspond to the newly-displayed images. By way of further example, selection of a play icon may result in the video corresponding to the play icon being initiated and displayed on the user interface 400. As the displayed content is updated when the user interacts with the user interface 400, events corresponding to the interactions may be identified and utilized to update a determination of the screen data being displayed. The updated screen data may be utilized by the remote system to more accurately determine intents associated with voice commands to interact with the displayed content, for example.

In examples, the user device and/or the remote system may be configured to rank directives to perform actions on the displayed content in examples where a determined intent corresponds to more than one action to be performed on a given object. For example, a voice command may represent an intent that may be determined to correspond to more than one action and/or that may correspond to an action that may be performed with respect to multiple objects. In these examples, the directives may be ranked such that an ambiguous voice command may result in a highest-ranked directive being sent to the user device and utilized to perform a given action. Ranking of directives may be based at least in part on historical use data, the application associated with the displayed content, the location of objects with respect to each other as displayed on the user device, categorization of intents, previous voice commands, and/or screen data updating, for example.

For example, historical use data may indicate that a given voice command, while corresponding to multiple directives, historically corresponds to a first directive more frequently than a second directive with respect to voice commands received via the user device. Additionally, or alternatively, data indicating that a given voice command, while corresponding to multiple directives, historically corresponds to a first directive more frequently than a second directive with respect to voice commands received via the user device and/or other devices may be utilized to rank the directives. The application may also provide an indication of which directives are to be prioritized more than other directives. Additionally, or alternatively, data indicating the location of objects with respect to each other as displayed on the user device may be utilized to rank directives. For example, directives to perform actions on objects that are displayed more prominently may be prioritized more than directives to perform actions on objects that are displayed less prominently. Additionally, or alternatively, certain intents may not be dependent on a specific object displayed on the user device and therefore may be associated with a predetermined directive. For example, a voice command of "scroll down" may correspond to an intent to display content that is not currently in view on the user device and may not correspond to an intent to perform an action with respect to an object displayed on the user device. Directives to perform actions based on intents that are not object dependent may be prioritized over directives to perform actions that are object dependent.

Additionally, or alternatively, data indicating previous voice commands may be utilized to rank directives. For example, a previous voice command may be "scroll down" and a subsequent voice command may be "more." Without contextual data indicating the previous voice command, the command of "more" could correspond to directives to perform actions such as showing more videos, providing more information about a certain video, playing more of a video, etc. However, utilizing the previous voice command of "scroll down," the directives may be ranked such that a directive to perform an additional scroll down action is prioritized over other directives. Additionally, or alternatively, data indicating that the screen data has changed or has otherwise been updated may be utilized to rank directives. Additionally, or alternatively, a predetermined prioritization of directives may be stored and utilized by the remote system.

For example, directives to perform actions on objects associated with the application may be ranked based at least in part on the type of object being acted on. For example, objects associated with both an image object 404 and a text object 402 may be prioritized over just text objects 402, just image objects 404, and/or text-input objects 406. For example, a voice command of "play video" may be associated with directives to perform actions on various objects, such as an image representing a video with a play icon 404 overlaid thereon, text objects 402 that read "play," an image object 404 including a play icon, and/or a text-input object 406 such as a search field to which the phrase "play video" may be inserted. In this example, the directive associated with the image and overlaid play icon may be prioritized over the other directives. Likewise, the play icon may be prioritized over the text that reads "play." Likewise, the text that reads "play" may be prioritized over the editable field.

Additionally, or alternatively, the ranking of directives may be based at least in part on the intent determined by the remote system to correspond to the voice command. For example, a determined intent of "play" may correspond to a ranking as discussed above. Additionally, or alternatively, a determined intent of "search for" may correspond to a ranking that prioritizes directives to perform actions on objects associated with text-input objects 406 over directives to perform actions on objects associated with selection of objects. Additionally, or alternatively, a determined intent of "select" may correspond to a ranking that prioritizes directives to perform actions on objects that, when selected, cause the content to be updated over directives to perform actions on other objects, such as inserting text into a search field. It should be understood that the examples of directive ranking are provided herein for illustration, and other examples of ranking directives are included in this disclosure. Other, non-limiting examples of intents may include "scroll," "move," "swipe," "page," "go back," "back," "go forward," "forward," "previous," "next," "resume," "pause," "stop," "rewind," and "fast forward."

In addition to, or instead of, ranking of directives generated by the remote system may be performed as described above, the directive received from the remote system may be associated with more than one action. For example, a "select" intent may correspond to opening a hyperlink, causing a video to play, causing additional information to be displayed, or other actions. The user device and/or an accessory device may be configured to prioritize actions corresponding to the directive based at least in part on the intent from the directive and/or contextual information associated with the application. The ranking of actions may be performed in the same or a similar manner as the ranking of directives as described with respect to FIG. 4.

Figure 5:
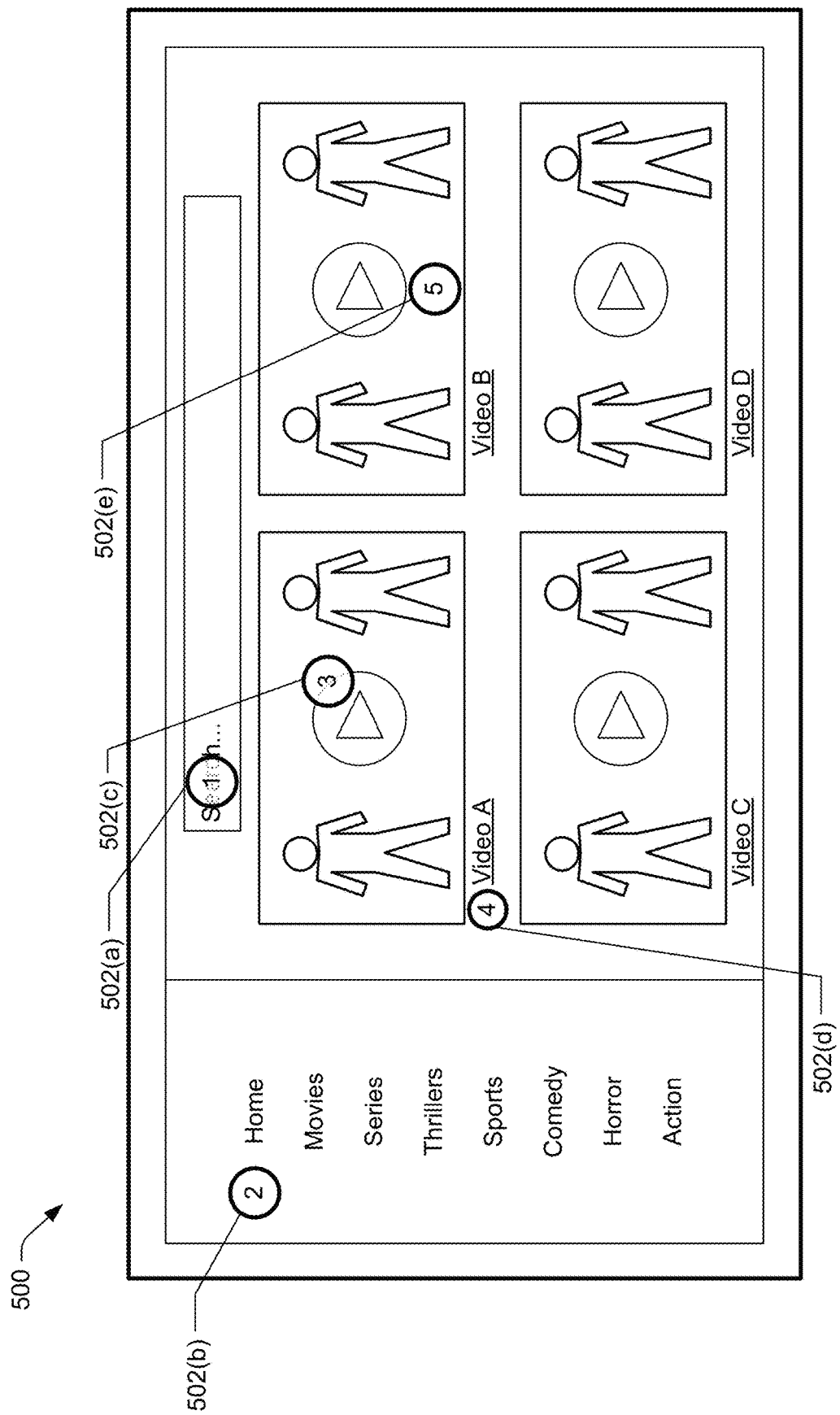
FIG. 5 illustrates another example user interface utilized for controlling computing devices via audible input.

FIG. 5 illustrates another example user interface 500 utilized for controlling computing devices via audible input. The user interface 500 may be displayed on a device, such as a user device 102 from FIG. 1. The user interface 500 may display content associated with an application, such as a third-party application. In the example provided with respect to FIG. 5, the third-party application is a video-playing application. It should be understood that while the example given with respect to FIG. 5 is a video-playing application, other applications that include objects that may be displayed on a device are included in this disclosure.

The user interface 500 may include one or more objects, which may include the same or similar objects as those described with respect to FIG. 4, above. As described with respect to FIG. 4, a user may provide a voice command to interact with the displayed content. Examples provided with respect to FIG. 4 included "select movies," "play Video C," and "search for dog videos." These voice commands are based at least in part on a user's perception of the objects rendered by the user device. In examples, a user may desire or require assistance in providing voice commands that result in the desired action being performed on the desired object.

In these examples, the user device, an accessory device, and/or the remote system may be configured to provide one or more "hints" to assist a user with providing a voice command and/or determining an intent from the voice command with more accuracy. For example, utilizing the screen data indicating the objects displayed on the screen, overlay content may be generated that provides numbers and/or letters, for example, associated with the displayed objects. The user, seeing the overlay content, may then provide a voice command that instructs the system to perform an action on a selected number and/or letter. For example, as shown in FIG. 5, the overlay content may include one or more renderings of hints 502(a)-(e). As used in this example, a hints 502(a)-(e) may be displayed as overlay content on one or more of the selectable objects being displayed on the user interface 500.

Here, a first hint 502(a) may correspond to a text-input field, a second hint 502(b) may correspond to selection of the "Home" object, a third hint 502(c) may correspond to selection of the play icon associated with "Video A," a fourth hint 502(d) may correspond to selection of a text object associated with "Video A," and/or a fifth hint 502(e) may correspond to selection of an image associated with "Video B." In examples, a number may be provided for each object displayed on the user interface 500. In other examples, only a portion of the objects may include an overlaid number. For example, a determination may be made that multiple objects, when selected, are associated with the same action. In these examples, one overlaid number may be displayed for the multiple objects. To illustrate using FIG. 5, the text object "Video B," the image associated with that text object, and the play icon overlaid on the image may all, when selected, cause "Video B" to be initiated and displayed on the user interface 500. In this example, instead of providing a number for each of the text object, the image, and the play icon, a single hint 502(e) may be overlaid on an area of the user interface 500 common to the multiple objects.

The user may provide then provide a voice command that corresponds to selection of one of the hints 502(a)-(e). For example, the user may provide a voice command of "select number 2," "select 2," "2," "select the second one," and/or so forth. The remote system may be provided with data indicating that hints are being provided to the user, along with data indicating which hints are associated with which objects. By so doing, audio data corresponding to the voice command may be processed by the remote system to more easily and/or accurately determine that the voice command corresponds to an intent to select one of the hints provided on the user interface 500 and to identify the hint selected by the user. The remote system may correlate the selected hint with the object corresponding to the hint and may provide a directive to perform an action on the object, as described more fully above. As a user interacts with the displayed content, such as through selecting hints, the content may change and/or be updated. The updated content may be utilized to determine updated screen data, which may be utilized to generate updated overlay content with updated hints to be utilized by the user. The updated data may be sent to the remote system to assist in determining intents and generating directives for subsequent voice commands.

As shown in FIG. 5, the hints are described as numbers. However, it should be understood that the hints 502(a)-(e) are provided by way of example and not as a limitation. Other hint identifiers may be utilized, such as letters, symbols, sounds, shapes, and/or colors, for example. The hints are also shown with respect to FIG. 5 as having one shape, namely circular. However, it should be understood that the hints may be any shape. Additionally, or alternatively, the size of the hint may be static or dynamic. For example, the size of hints may be consistent with respect to particular overlay content. Alternatively, the size of the hints may vary. For example, a size of a rendered object may be determined and that information may be utilized to generate a hint having a size that is similar to the rendered object. As shown in FIG. 5, for example, the hints 502(b) is larger than the hints 504(d). This size difference may be based at least in part on the differing sizes of object renderings to which the hints correspond. Additionally, or alternatively, the renderings of the hints may have a translucence or transparency, which may allow a user to view some or all of the object on which the hint overlay is applied to the user interface 500.

FIGS. 6-11 illustrate various processes for voice control of computing devices. The processes described herein are illustrated as collections of blocks in logical flow diagrams, which represent a sequence of operations, some or all of which may be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation, unless specifically noted. Any number of the described blocks may be combined in any order and/or in parallel to implement the process, or alternative processes, and not all of the blocks need be executed. For discussion purposes, the processes are described with reference to the environments, architectures and systems described in the examples herein, such as, for example those described with respect to FIGS. 1-5 and 12, although the processes may be implemented in a wide variety of other environments, architectures and systems.

Figure 6:
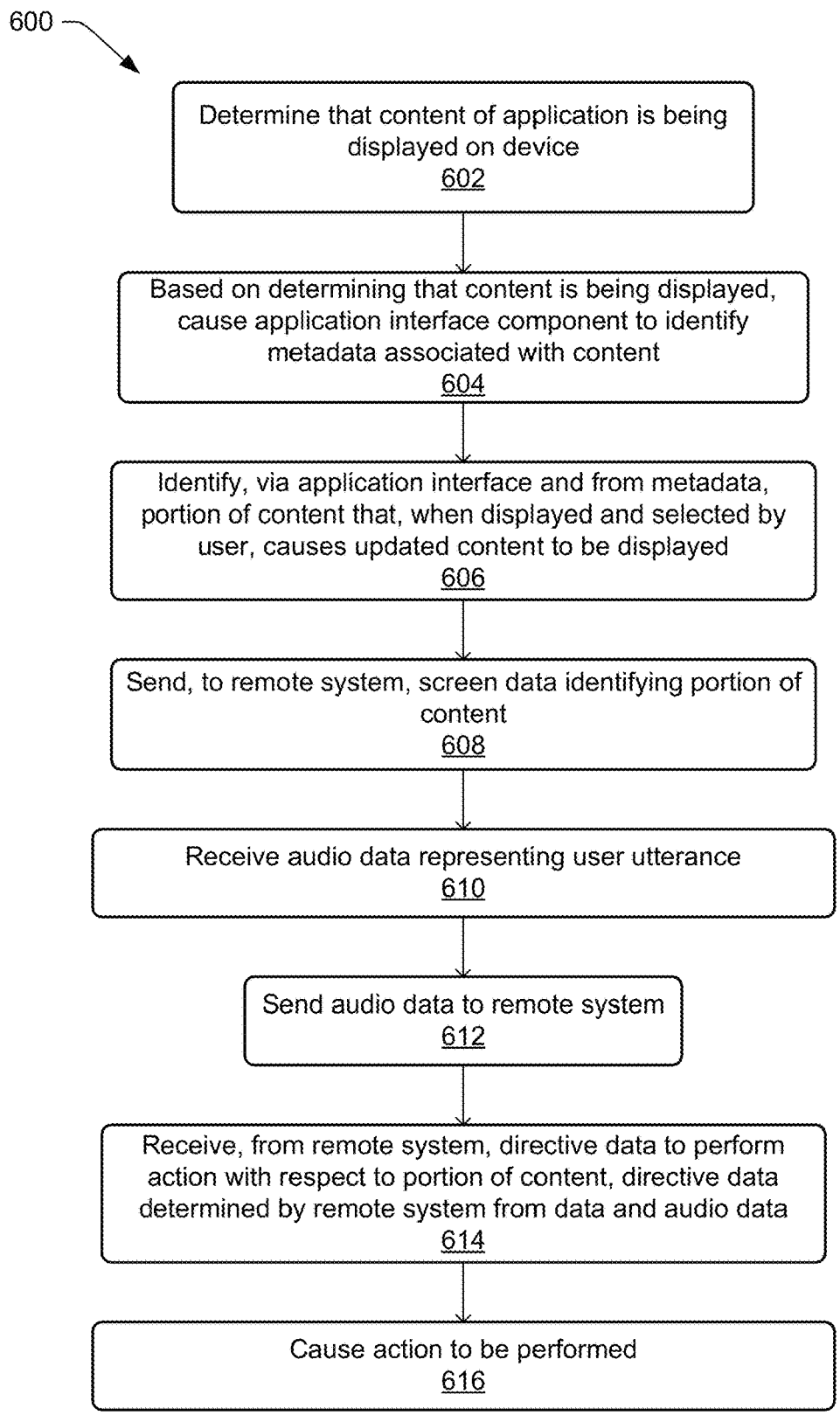
FIG. 6 illustrates a flow diagram of an example process for controlling computing devices via audible input.

FIG. 6 illustrates a flow diagram of an example process 600 for controlling computing devices via audible input. The order in which the operations or steps are described is not intended to be construed as a limitation, and any number of the described operations may be combined in any order and/or in parallel to implement process 600.

At block 602, process 600 may include determining that content of an application is being displayed on a device. The application may be without instructions for utilizing voice commands to interact with the displayed content. For example, the application may be a third-party application that has not enabled voice interactions with the content of the application. The third-party application may include an identifier of the application along with data representing the content associated with the application. The content may be described as nodes of a DOM tree, which may be utilized to perform actions on the content. As described herein, objects may be displayed on the user device. The objects may correspond to one or more nodes of the DOM tree of the application. Determining that content of the application is currently being displayed may include receiving data from the application and/or another system on which the application is stored indicating that the application is being utilized. Additionally, or alternatively, an event handler may receive an indication that an event corresponding to opening the application has occurred.

At block 604, the process 600 may include causing an application interface component to identify metadata associated with the content, which may be based at least in part on determining that the content is being displayed. The application interface component may be configured to identify content being displayed. The application interface component may be a component of the device or another device in communication with the first device. The application interface component may receive data from the application, such as via one or more APIs, that may indicate the content that is being displayed on the display.

At block 606, the process 600 may include identifying, via the application interface and from the metadata, a portion of the content that, when displayed and selected by a user, causes updated content to be displayed. The portion of the content may correspond to an object or selectable object that is selectable by a user and/or a node of a document object model associated with the application. Identifying selectable objects may be based at least in part on determining screen data associated with the displayed content. The screen data may include document object model (DOM) information associated with the content of the application. The DOM information may include identification of one or more objects corresponding to the displayed content and/or one or more relationships between the objects. The DOM may be an application programming interface (API) that represents hypertext markup language (HTML), extensible markup language (XML), and/or other computing languages in a tree structure where each node of the tree represents an object representing part of the application content. When an object is acted upon in the tree, corresponding changes may be reflected in the display of content of the application. One or more libraries associated with the API may be provided to allow one or more actions to be taken with respect to the nodes in the DOM tree.

At block 608, the process 600 may include sending, to the remote system, screen data identifying the portion of the content. The screen data may be sent to the remote system via the network and network interfaces described herein. Data indicating one or more relationships between objects may additionally be sent to the remote system.

At block 610, the process 600 may include receiving audio data representing a user utterance. Receiving the audio data may include capturing audio, via one or more microphones, from an environment in which the device is disposed and generating corresponding audio data. For example, the audio may include an utterance from a user in the environment. Audio corresponding to this user utterance may be captured by one or more microphones of the user device and/or an accessory device, and the corresponding audio data may be generated.

At block 612, the process 600 may include sending the audio data to the remote system. The audio data may be sent to the remote system via the networks and the network interfaces described herein. One or more instructions and/or data may be sent to the remote system along with the audio data to associate the audio data with the device, a related accessory device, a user profile associated with the device, a user account associated with the device, and/or the screen data sent to the remote system.

At block 614, the process 600 may include receiving, from the remote system, directive data to perform an action with respect to the portion of the content. The directive data may be determined by the remote system from the screen data and the audio data. For example, the remote system may perform automatic speech recognition (ASR) on the audio data to generate corresponding text data. Natural language understanding (NLU) techniques may be performed on the text data to determine an intent associated with the utterance. ASR and NLU techniques are described in more detail below with respect to FIG. 12. As part of determining the intent associated with the utterance, named entity recognition may be performed in connection with the natural language understanding to identify portions of the text data that correspond to a named entity that may be recognizable by the remote system. The process may link a text portion to a specific entity known to the remote system.

To perform named entity recognition, the screen data may be utilized. The screen data may be used for entity recognition, for example, by matching results of the ASR operations with different entities associated with the application, such as objects displayed on the user device. In this way, a data source database may be populated with some or all of the screen data provided by the user device to assist in named entity recognition. In this way, the NLU component of the remote system may be trained or otherwise configured to select an intent based on the screen data corresponding to content that is currently being displayed on the user device. Additionally, the NLU component may determine a value for one or more slots associated with the intent based on the screen data.

The intent determined by the NLU component, with, in examples, assistance from the entity recognition operations, may be sent to a speechlet configured to generate directive data to perform actions with respect to the third-party application. The speechlet may generate the directive data for the device to perform based at least in part on the intent determined by the remote system. The screen data may be utilized to generate directive data for the device and/or one or more accessory devices to be performed that effectuates the determined intent. Based at least in part on determining that the utterance corresponds to a given intent, directive data corresponding to the intent, along with an indication of the object(s) on which to perform the intended action, the directive data may be generated and sent to the device.

At block 616, the process 600 may include causing the action to be performed. A directive handler of the device may receive the directive data and may determine an action to be performed based at least in part on the directive data. The directive handler may send data to a device event controller indicating the selected action to be performed along with information about the object on which to perform the action. The device event controller may then determine which components of the device are to be utilized to perform the action determined by the directive handler. The device event controller may be further configured to identify and/or determine when an event occurs that corresponds to displayed content changing and/or being updated. Examples of such an event may include initiating an application, a user interaction with the content that causes the content to be updated, a refresh of the content, and/or time-dependent changes to the displayed content.

A node processing component of the device may receive data from the device event controller indicating the action to be performed and the objects on which the action is to be performed. The node processing component may identify stored node information. The node processing component may attempt to match or substantially match the identified object from the directive to a node associated with the application. This process may be performed using a keyword search, where the keyword(s) used in the search may be words used to describe the object. The node that matches or best matches the searched-for phrase may be selected as the node on which the action is to be performed. A keyword processing component of the user device may be utilized to return a list of searchable words with stop words, such as "and," "of," and/or "the" filtered out. This information may be utilized to match the keywords to the proper node. Having determined the node on which to perform an action and having determined the action to be performed, the action may be performed on the node of the application.

The process 600 may additionally include receiving event data indicating that an event has occurred with respect to the content. The process 600 may additionally include determining that the event corresponds at least in part to second content being displayed on the display. Based at least in part on determining that the second content is being displayed, a second portion of the second content may be identified. The process 600 may include sending, to the remote system, second screen data identifying the second portion. The second portion may differ from the first portion. In this way, the screen data identified, determined, and/or sent to the remote system may be updated as the displayed content is updated. The updated screen data may be utilized by the remote system to inform natural language understanding of subsequent voice commands and generation of subsequent directives to be performed by the device. Determining that at least a portion of the user interface displayed on the device has changed may be based at least in part on a determination that an event has occurred with respect to the content displayed on the device. For example, the event may include opening of an application, interaction by the user with the content, refreshing of content, and/or time-dependent changes to the displayed content. The device event controller of the device, based at least in part on identifying and/or determining that an event has occurred, may cause a third-party application interface component of the device to identify and/or determine updated content being displayed on the device.

The process 600 may additionally, or alternatively, include causing display of overlay content on the user interface. The overlay content may include an identifier proximate to the selectable object. The process 600 may also include sending, to the remote system, second data associating the identifier with the selectable object. The second data may be utilized by the remote system to generate the directive and/or to determine an intent associated with the voice command. For example, the user device, an accessory device, and/or the remote system may be configured to provide one or more "hints" to assist a user with providing a voice command and/or determining an intent from the voice command with more accuracy. For example, utilizing the screen data indicating the objects displayed on the screen, overlay content may be generated that provides numbers and/or letters, for example, associated with the displayed objects. The user, seeing the overlay content, may then provide a voice command that instructs the system to perform an action on a selected number and/or letter. For example, the overlay content may include one or more rendering of numbers. As used in this example, a number may be displayed as overlay content on one or more of the selectable objects being displayed on the user interface.

In examples, a number may be provided for each object displayed on the user interface. In other examples, only a portion of the objects may include an overlaid number. For example, a determination may be made that multiple objects, when selected, are associated with the same action. In these examples, one overlaid number may be displayed for the multiple objects. In this example, instead of providing a number for each of multiple objects such as a text object, an image, and/or a play icon, a single number may be overlaid on an area of the user interface common to the multiple objects.

The user may provide then provide a voice command that corresponds to selection of one of the numbers. The remote system may be provided with data indicating that hints are being provided to the user, along with data indicating which objects are associated with which objects. By so doing, audio data corresponding to the voice command may be processed by the remote system to more easily and/or accurately determine that the voice command corresponds to an intent to select one of the hints provided on the user interface and to identify the hint selected by the user. The remote system may correlate the selected hint with the object corresponding to the hint and may provide a directive to perform an action on the object, as described more fully above. As a user interacts with the displayed content, such as through selecting hints, the content may change and/or be updated. The updated content may be utilized to determine updated screen data, which may be utilized to generate updated overlay content with updated hints to be utilized by the user. The updated data may be sent to the remote system to assist in determining intents and generating directives for subsequent voice commands.

The process 600 may additionally, or alternatively, include determining that the directive corresponds to a first action and a second action. The first action may be associated with a first priority and the second action may be associated with a second priority. The process 600 may also include determining that the first priority is greater than the second priority and selecting one of the first action or the second action to be performed on an object based at least in part on the priority. For example, a "select" intent may correspond to opening a hyperlink, causing a video to play, causing additional information to be displayed, or other actions. Actions such as these may be prioritized based at least in part on the intent from the directive and/or contextual information associated with the application. For example, historical use data may indicate that a given intent, while corresponding to multiple actions, historically corresponds to a first action more frequently than a second action with respect to intents received via the device. Additionally, or alternatively, data indicating that a given intent, while corresponding to multiple actions, historically corresponds to a first action more frequently than a second action with respect to voice commands received via the device and/or other devices. The application may also provide an indication of which actions are to be prioritized more than other actions.

Additionally, or alternatively, data indicating the location of objects with respect to each other as displayed on the device may be utilized to rank actions. For example, actions to be performed on objects that are displayed more prominently may be prioritized more than actions to be performed on objects that are displayed less prominently. Additionally, or alternatively, certain intents may not be dependent on a specific object displayed on the device and therefore may be associated with a predetermined action. For example, a voice command of "scroll down" may correspond to an intent to display content that is not currently in view on the device and may not correspond to an intent to perform an action with respect to an object displayed on the device. Actions based on intents such as this that are not object dependent may be prioritized over actions that are object dependent.

Additionally, or alternatively, data indicating previous voice commands may be utilized to rank actions. For example, a previous voice command may be "scroll down" and a subsequent voice command may be "more." Without contextual data indicating the previous voice command, the command of "more" could correspond to actions such as showing more videos, providing more information about a certain video, playing more of a video, etc. However, utilizing the previous voice command of "scroll down," the actions may be ranked such that an action to perform an additional scroll down is prioritized over other actions. Additionally, or alternatively, data indicating that the screen data has changed or otherwise been updated may be utilized to rank actions. Additionally, or alternatively, a predetermined prioritization of actions may be stored and utilized. It should be understood that the examples of action ranking are provided herein for illustration, and other examples of ranking actions are included in this disclosure.

Additionally, or alternatively, the process 600 may include determining, from document-object-model information indicating nodes associated with the content, a first node of the content that corresponds to a value associated with the action and a second node of the content that corresponds to the value. The process 600 may also include determining confidence levels associated with the first node and the second node indicating a confidence that the nodes correspond to the value. The action may be performed based at least in part on which confidence level is prioritized.

Figure 7:
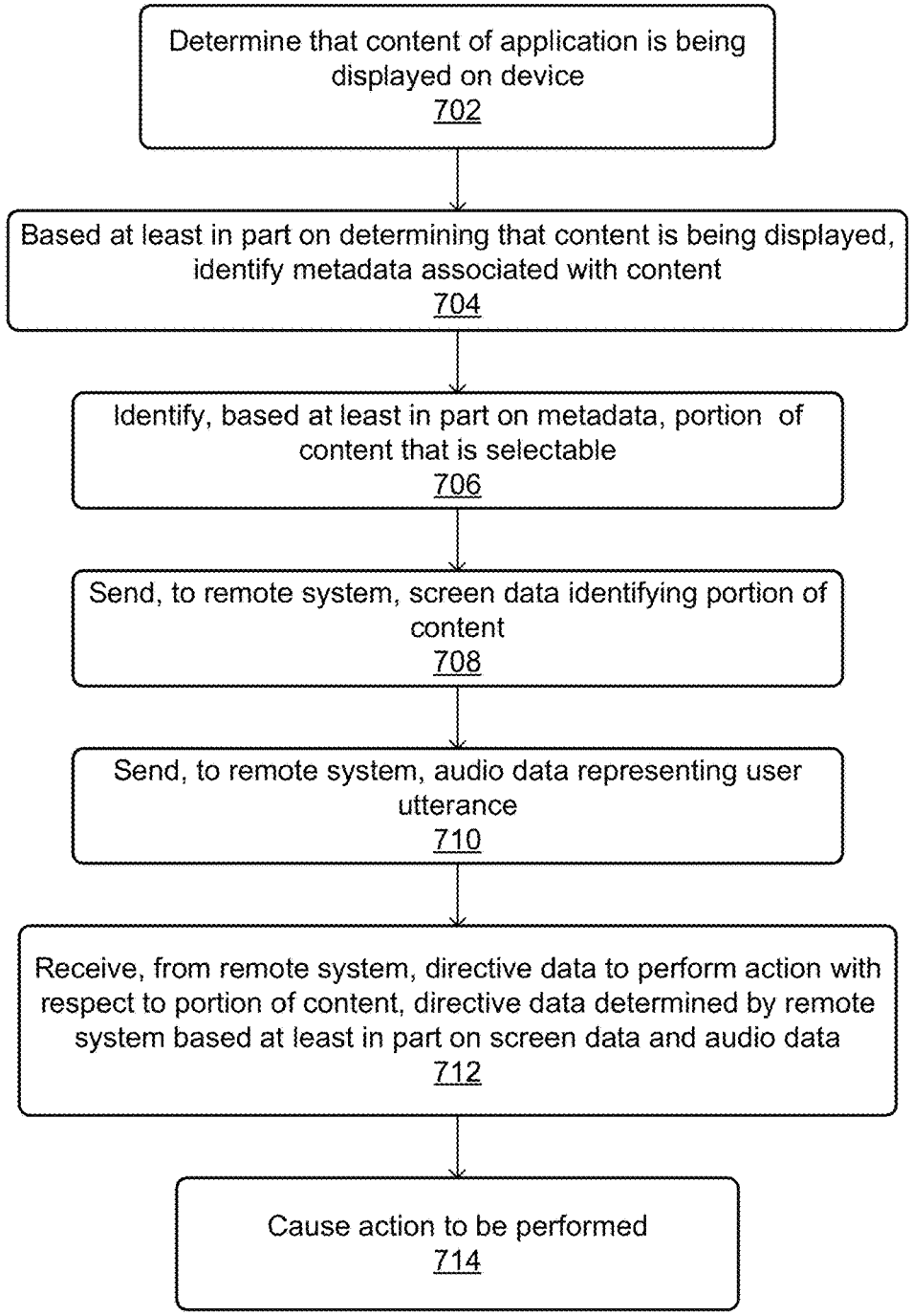
FIG. 7 illustrates a flow diagram of another example process for controlling computing devices via audible input.

FIG. 7 illustrates a flow diagram of an example process 700 for controlling computing devices via audible input. The order in which the operations or steps are described is not intended to be construed as a limitation, and any number of the described operations may be combined in any order and/or in parallel to implement process 700.

At block 702, the process 700 may include determining that content of an application is being displayed on a device. This determination may be based at least in part on initiating the application. In examples, the application may be without instructions for utilizing voice commands to interact with the displayed content. For example, the application may be a third-party application that has not enabled voice interactions with the content of the application. The third-party application may include an identifier of the application along with data representing the content associated with the application. The content may be described as nodes of a DOM tree, which may be utilized to perform actions on the content. As described herein, objects may be displayed on the user device. The objects may correspond to one or more nodes of the DOM tree of the application.

At block 704, the process 700 may include identifying metadata associated with the content based at least in part on determining that the content is being displayed. The metadata may include indicators of which portions of the application content are currently being utilized to render the display of objects on the device.

At block 706, the process 700 may include identifying, based at least in part on the metadata, a portion of the content that is selectable. For example, a portion of the content of the application may be associated with a link or other mechanism that, when a rendering of that content is selected by a user, causes the application and/or a device utilizing the application to update the content being displayed. By way of example, such a portion of the content may be associated with a "play button" object displayed on the device. A user may select the play button object, and by so doing, the application may include instructions to update the displayed content to something linked to the selection of the play button object. The object may be selectable via a user interface of the device and/or may correspond to at least a portion of node of a document object model associated with the application. Identifying objects may be based at least in part on determining screen data associated with the displayed content. The screen data may include document object model (DOM) information associated with the content of the application. The DOM information may include identification of one or more objects corresponding to the displayed content and/or one or more relationships between the objects. The DOM may be an application programming interface (API) that represents hypertext markup language (HTML), extensible markup language (XML), and/or other computing languages in a tree structure where each node of the tree represents an object representing part of the application content. When an object is acted upon in the tree, corresponding changes may be reflected in the display of content of the application. One or more libraries associated with the API may be provided to allow one or more actions to be taken with respect to the nodes in the DOM tree.

At block 708, the process 700 may include sending, to the remote system, screen data identifying the portion of the content. The screen data may be sent to the remote system via the network and network interfaces described herein. Data indicating one or more relationships between the objects may additionally be sent to the remote system.

At block 710, the process 700 may include sending, to the remote system, audio data representing a user utterance. The user utterance may correspond to a request to interact with the content being displayed on the device.

At block 712, the process 700 may include receiving, from the remote system and based at least in part on audio data representing the user utterance, directive data to perform an action with respect to the portion of the content. The directive data may be determined by the remote system based at least in part on the screen data and the audio data. For example, the remote system may perform automatic speech recognition (ASR) on the audio data to generate corresponding text data. Natural language understanding (NLU) techniques may be performed on the text data to determine an intent associated with the voice command. ASR and NLU techniques are described in more detail below with respect to FIG. 12. As part of determining the intent associated with the user utterance, named entity recognition may be performed in connection with the natural language understanding to identify portions of the text data that correspond to a named entity that may be recognizable by the remote system. The process may link a text portion to a specific entity known to the remote system.

To perform named entity recognition, the screen data may be utilized. The screen data may be used for entity recognition, for example, by matching results of the ASR operations with different entities associated with the application, such as portion of content displayed on the user device. In this way, a data source database may be populated with some or all of the screen data provided by the user device to assist in named entity recognition. In this way, the NLU component of the remote system may be trained or otherwise configured to select an intent based on the screen data corresponding to content that is currently being displayed on the user device. Additionally, the NLU component may determine a value for one or more slots associated with the intent based on the screen data.

The intent determined by the NLU component, with, in examples, assistance from the entity recognition operations, may be sent to a speechlet configured to generate directive data to perform actions with respect to the third-party application. The speechlet may generate the directive data for the device to perform based at least in part on the intent determined by the remote system. The screen data may be utilized to generate directive data for the device and/or one or more the accessory devices to be performed that effectuates the determined intent. Based at least in part on determining that the utterance corresponds to a given intent directive data corresponding to the intent, along with an indication of the object(s) on which to perform the intended action, the directive data may be generated and sent to the device.

At block 714, the process 700 may include causing the action to be performed with respect to at least a portion of the content. A directive handler of the device may receive the directive data and may determine an action to be performed based at least in part on the directive data. The directive handler may send data to a device event controller indicating the selected action to be performed along with information about the object on which to perform the action. The device event controller may then determine which components of the device are to be utilized to perform the action determined by the directive handler. The device event controller may be further configured to identify and/or determine when an event occurs that corresponds to displayed content changing and/or being updated. Examples of such an event may include initiating an application, a user interaction with the content that causes the content to be updated, a refresh of the content, and/or time-dependent changes to the displayed content.

A node processing component of the device may receive data from the device event controller indicating the action to be performed and the objects on which the action is to be performed. The node processing component may identify stored node information. The node processing component may attempt to match or substantially match the identified object from the directive to a node associated with the application. This process may be performed using a keyword search, where the keyword(s) used in the search may be words used to describe the object. The node that matches or best matches the searched-for phrase may be selected as the node on which the action is to be performed. A keyword processing component of the user device may be utilized to return a list of searchable words with stop words, such as "and," "of," and/or "the" filtered out. This information may be utilized to match the keywords to the proper node. Having determined the node on which to perform an action and having determined the action to be performed, the action may be performed on the node of the application.

The process 700 may additionally, or alternatively, include causing display of overlay content on the content. The overlay content may include an identifier proximate to an object associated with the portion of the content. The process 700 may also include sending, to the remote system, data associating the identifier with the object. The second data may be utilized by the remote system to generate the directive and/or to determine an intent associated with the voice command. For example, the user device, an accessory device, and/or the remote system may be configured to provide one or more "hints" to assist a user with providing a voice command and/or determining an intent from the voice command with more accuracy. For example, utilizing the screen data indicating the objects displayed on the screen, overlay content may be generated that provides numbers and/or letters, for example, associated with the displayed objects. The user, seeing the overlay content, may then provide a voice command that instructs the system to perform an action on a selected number and/or letter. For example, the overlay content may include one or more rendering of numbers. As used in this example, a number may be displayed as overlay content on one or more of the selectable objects being displayed on the user interface.

In examples, a number may be provided for each object displayed on the user interface. In other examples, only a portion of the objects may include an overlaid number. For example, a determination may be made that multiple objects, when selected, are associated with the same action. In these examples, one overlaid number may be displayed for the multiple objects. In this example, instead of providing a number for each of multiple objects such as a text object, an image, and/or a play icon, a single number may be overlaid on an area of the user interface common to the multiple objects.

The user may provide then provide a voice command that corresponds to selection of one of the numbers. The remote system may be provided with data indicating that hints are being provided to the user, along with data indicating which objects are associated with which objects. By so doing, audio data corresponding to the voice command may be processed by the remote system to more easily and/or accurately determine that the voice command corresponds to an intent to select one of the hints provided on the user interface and to identify the hint selected by the user. The remote system may correlate the selected hint with the object corresponding to the hint and may provide a directive to perform an action on the object, as described more fully above. As a user interacts with the displayed content, such as through selecting hints, the content may change and/or be updated. The updated content may be utilized to determine updated screen data, which may be utilized to generate updated overlay content with updated hints to be utilized by the user. The updated data may be sent to the remote system to assist in determining intents and generating directives for subsequent voice commands.

The process 700 may additionally, or alternatively, include determining that the directive corresponds to a first action and a second action. The first action may be associated with a first priority and the second action may be associated with a second priority. The process 700 may also include determining that the first priority is greater than the second priority and selecting one of the first action or the second action to be performed on an object based at least in part on the priority. For example, a "select" intent may correspond to opening a hyperlink, causing a video to play, causing additional information to be displayed, or other actions. Actions such as these may be prioritized based at least in part on the intent from the directive and/or contextual information associated with the application. For example, historical use data may indicate that a given intent, while corresponding to multiple actions, historically corresponds to a first action more frequently than a second action with respect to intents received via the device. Additionally, or alternatively, data indicating that a given intent, while corresponding to multiple actions, historically corresponds to a first action more frequently than a second action with respect to voice commands received via the device and/or other devices. The application may also provide an indication of which actions are to be prioritized more than other actions.

Additionally, or alternatively, data indicating the location of objects with respect to each other as displayed on the device may be utilized to rank actions. For example, actions to be performed on objects that are displayed more prominently may be prioritized more than actions to be performed on objects that are displayed less prominently. Additionally, or alternatively, certain intents may not be dependent on a specific object displayed on the device and therefore may be associated with a predetermined action. For example, a voice command of "scroll down" may correspond to an intent to display content that is not currently in view on the device and may not correspond to an intent to perform an action with respect to an object displayed on the device. Actions based on intents such as this that are not object dependent may be prioritized over actions that are object dependent.

Additionally, or alternatively, data indicating previous voice commands may be utilized to rank actions. For example, a previous voice command may be "scroll down" and a subsequent voice command may be "more." Without contextual data indicating the previous voice command, the command of "more" could correspond to actions such as showing more videos, providing more information about a certain video, playing more of a video, etc. However, utilizing the previous voice command of "scroll down," the actions may be ranked such that an action to perform an additional scroll down is prioritized over other actions. Additionally, or alternatively, data indicating that the screen data has changed or otherwise been updated may be utilized to rank actions. Additionally, or alternatively, a predetermined prioritization of actions may be stored and utilized. It should be understood that the examples of action ranking are provided herein for illustration, and other examples of ranking actions are included in this disclosure.

The process 700 may additionally, or alternatively, include determining that second content associated with the application is being displayed on the device. Based at least in part on determining that the second content is being displayed on the device, a second content displayed on the device may be identified. The process 700 may include sending, to the remote system, second screen data identifying the second content. The second content may differ from the first content. In this way, the screen data identified, determined, and/or sent to the remote system may be updated as the displayed content is updated. The updated screen data may be utilized by the remote system to inform natural language understanding of subsequent voice commands and generation of subsequent directives to be performed by the device. Determining that at least a portion of the content displayed on the device has changed may be based at least in part on a determination that an event has occurred with respect to the content displayed on the device. For example, the event may include opening of an application, interaction by the user with the content, refreshing of content, and/or time-dependent changes to the displayed content. The device event controller of the device, based at least in part on identifying and/or determining that an event has occurred, may cause a third-party application interface component of the device to identify and/or determine updated content being displayed on the device.

Figure 8:
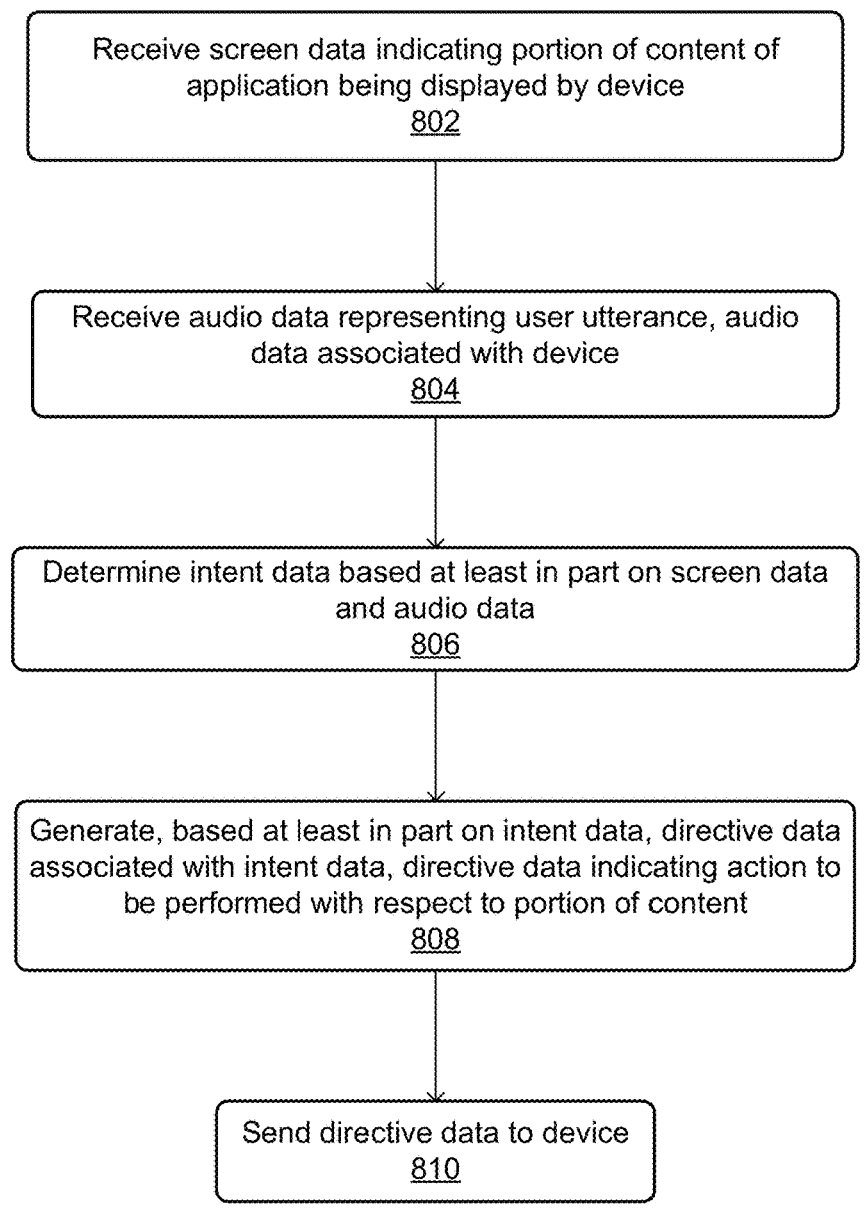
FIG. 8 illustrates a flow diagram of another example process for controlling computing devices via audible input.

FIG. 8 illustrates a flow diagram of an example process 800 for controlling computing devices via audible input. The order in which the operations or steps are described is not intended to be construed as a limitation, and any number of the described operations may be combined in any order and/or in parallel to implement process 800.

At block 802, process 800 may include receiving screen data indicating a portion of content of an application being displayed on the device. The application may be without instructions for utilizing voice commands to interact with the displayed content. For example, the application may be a third-party application that has not enabled voice interactions with the content of the application. The third-party application may include an identifier of the application along with data representing the content associated with the application. The content may be described as nodes of a DOM tree, which may be utilized to perform actions on the content. These nodes may also be described as and/or correspond to objects. As described herein, objects may be displayed on the user device. The objects may correspond to one or more nodes of the DOM tree of the application. Determining that the application is currently being displayed may include receiving data from the application and/or another system on which the application is stored indicating that the application is being utilized. Additionally, or alternatively, an event handler may receive an indication that an event corresponding to opening the application has occurred.

The objects may correspond to at least a portion of nodes of a document object model associated with the application. Identifying objects may be based at least in part on determining screen data associated with the displayed content. The screen data may include document object model (DOM) information associated with the content of the application. The DOM information may include identification of one or more objects corresponding to the displayed content and/or one or more relationships between the objects. The DOM may be an application programming interface (API) that represents hypertext markup language (HTML), extensible markup language (XML), and/or other computing languages in a tree structure where each node of the tree represents an object representing part of the application content. When an object is acted upon in the tree, corresponding changes may be reflected in the display of content of the application. One or more libraries associated with the API may be provided to allow one or more actions to be taken with respect to the nodes in the DOM tree.

At block 804, the process 800 may include receiving audio data representing a user utterance. The audio data may be associated with the device. The audio data may be generated by one or more microphones capturing corresponding audio within the environment in which the device is disposed. For example, the audio may include a user utterance from a user in the environment. Audio corresponding to this utterance may be captured by one or more microphones of the user device and/or an accessory device, and the corresponding audio data may be generated.

At block 806, the process 800 may include determining intent data based at least in part on the screen data and the audio data. For example, the system may perform automatic speech recognition (ASR) on the audio data to generate corresponding text data. Natural language understanding (NLU) techniques may be performed on the text data to determine an intent associated with the voice command. ASR and NLU techniques are described in more detail below with respect to FIG. 12. Determining the intent data may be based at least in part on a finite state transducer associated with the speechlet generating directive data to be sent to the device and/or associated with the application. As part of determining the intent data associated with the utterance, named entity recognition may be performed in connection with the natural language understanding to identify portions of the text data that correspond to a named entity that may be recognizable by the remote system. The process may link a text portion to a specific entity known to the remote system.

To perform named entity recognition, the screen data may be utilized. The screen data may be used for entity recognition, for example, by matching results of the ASR operations with different entities associated with the application, such as objects displayed on the user device. In this way, a data source database may be populated with some or all of the screen data provided by the user device to assist in named entity recognition. In this way, the NLU component of the remote system may be trained or otherwise configured to select an intent based on the screen data corresponding to content that is currently being displayed on the user device.

At block 808, the process 800 may include generating directive data associated with the intent data. The generating may be based at least in part on the intent data. The directive data may indicate an action to be performed with respect to the portion of the content. The intent data may be determined by the NLU component, with, in examples, assistance from the entity recognition operations, may be sent to a speechlet configured to generate directives to perform actions with respect to the third-party application. The speechlet may generate the directive data for the device to perform based at least in part on the intent data determined by the remote system. The speechlet may be a speech processing component of multiple speech processing components associated with the remote system. The speechlet may be selected from other speech processing components based at least in part on the first data indicating that content associated with the application is being displayed and/or the second data identifying the portion of the content. The screen data may be utilized to generate directive data for the device and/or one or more the accessory devices to be performed that effectuates the determined intent. Based at least in part on determining that the utterance corresponds to a given intent directive data corresponding to the intent, along with an indication of the object(s) on which to perform the intended action, the directive data may be generated and sent to the device.

Generating the directive data may be based at least in part on an indication that the application has been authorized to receive the directive data. For example, when a third-party application developer publishes an application for sale or consumption on an application store, the developer may be queried by the application store to determine whether the developer would like to voice enable the application. If the developer indicates that voice enablement is authorized, an indication of the application may be stored in a registry. Thereafter, when data indicating that content of the application is being displayed on a device, audio data corresponding to voice commands may be processed to voice enable the application.

At block 810, the process 800 may include sending the directive data to the device. A directive handler of the device may receive the directive data and may determine an action to be performed based at least in part on the directive data. The directive handler may send data to a device event controller indicating the selected action to be performed along with information about the object on which to perform the action. The device event controller may then determine which components of the device are to be utilized to perform the action determined by the directive handler. The device event controller may be further configured to identify and/or determine when an event occurs that corresponds to displayed content changing and/or being updated. Examples of such an event may include initiating an application, a user interaction with the content that causes the content to be updated, a refresh of the content, and/or time-dependent changes to the displayed content.

A node processing component of the device may receive data from the device event controller indicating the action to be performed and the objects on which the action is to be performed. The node processing component may identify stored node information. The node processing component may attempt to match or substantially match the identified object from the directive to a node associated with the application. This process may be performed using a keyword search, where the keyword(s) used in the search may be words used to describe the object. The node that matches or best matches the searched-for phrase may be selected as the node on which the action is to be performed. A keyword processing component of the user device may be utilized to return a list of searchable words with stop words, such as "and," "of," and/or "the" filtered out. This information may be utilized to match the keywords to the proper node. Having determined the node on which to perform an action and having determined the action to be performed, the action may be performed on the node of the application.

The process 800 may additionally, or alternatively, include generating an identifier corresponding to at least one of the objects associated with the application and sending the identifier to the device to be displayed. The process 800 may also include determining that the intent corresponds to a selection of the identifier. Generation of the directive and/or determination an intent associated with the voice command may be based at least in part on selection of the identifier. For example, the user device, an accessory device, and/or the remote system may be configured to provide one or more "hints" to assist a user with providing a voice command and/or determining an intent from the voice command with more accuracy. For example, utilizing the screen data indicating the objects displayed on the screen, overlay content may be generated that provides numbers and/or letters, for example, associated with the displayed objects. The user, seeing the overlay content, may then provide a voice command that instructs the system to perform an action on a selected number and/or letter. For example, the overlay content may include one or more rendering of numbers. As used in this example, a number may be displayed as overlay content on one or more of the objects being displayed on the user interface.

In examples, a number may be provided for each object displayed on the user interface. In other examples, only a portion of the objects may include an overlaid number. For example, a determination may be made that multiple objects, when selected, are associated with the same action. In these examples, one overlaid number may be displayed for the multiple objects. In this example, instead of providing a number for each of multiple objects such as a text object, an image, and/or a play icon, a single number may be overlaid on an area of the user interface common to the multiple objects.

The user may provide then provide a voice command that corresponds to selection of one of the numbers. The remote system may be provided with data indicating that hints are being provided to the user, along with data indicating which objects are associated with which objects. By so doing, audio data corresponding to the voice command may be processed by the remote system to more easily and/or accurately determine that the voice command corresponds to an intent to select one of the hints provided on the user interface and to identify the hint selected by the user. The remote system may correlate the selected hint with the object corresponding to the hint and may provide a directive to perform an action on the object, as described more fully above. As a user interacts with the displayed content, such as through selecting hints, the content may change and/or be updated. The updated content may be utilized to determine updated screen data, which may be utilized to generate updated overlay content with updated hints to be utilized by the user. The updated data may be sent to the remote system to assist in determining intents and generating directives for subsequent voice commands.

Figure 9:
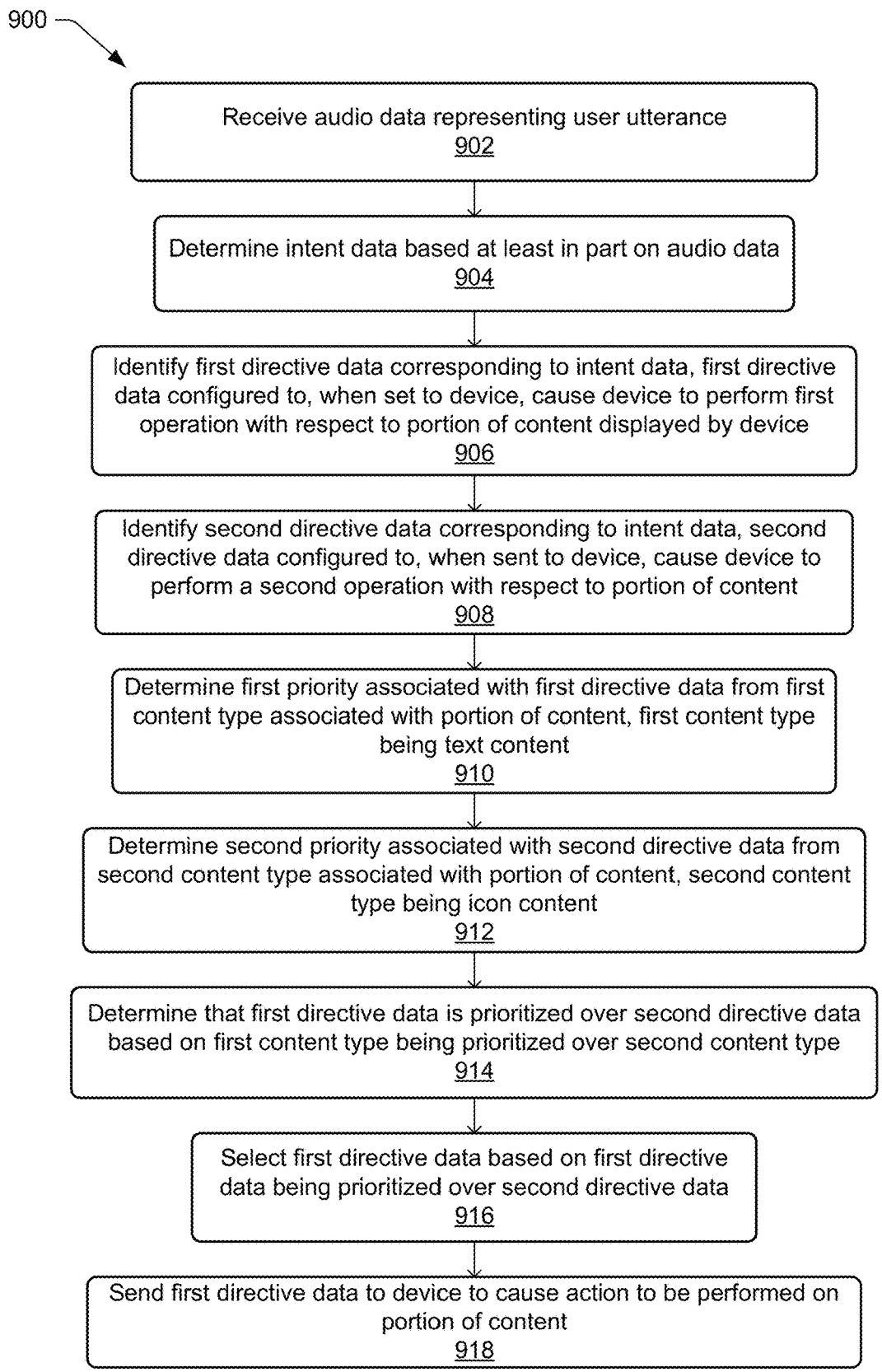
FIG. 9 illustrates a flow diagram of an example process for ranking directive data to be sent to a device displaying content.

FIG. 9 illustrates a flow diagram of an example process 900 for ranking directives. The order in which the operations or steps are described is not intended to be construed as a limitation, and any number of the described operations may be combined in any order and/or in parallel to implement process 900.

At block 902, the process 900 may include receiving audio data representing a user utterance. The audio data may correspond to audio captured via one or more microphones from an environment in which a device is disposed. For example, the audio may include a user utterance from a user in the environment. Audio corresponding to this utterance may be captured by one or more microphones of the user device and/or an accessory device, and the corresponding audio data may be generated.

At block 904, the process 900 may include determining intent data based at least in part on the audio data. For example, the automatic speech recognition (ASR) may be performed on the audio data to generate corresponding text data. Natural language understanding (NLU) techniques may be performed on the text data to determine an intent associated with the user utterance. ASR and NLU techniques are described in more detail below with respect to FIG. 12. As part of determining the intent data associated with the utterance, named entity recognition may be performed in connection with the natural language understanding to identify portions of the text data that correspond to a named entity that may be recognizable by the remote system. The process may link a text portion to a specific entity known to the remote system.

To perform named entity recognition, screen data indicating objects displayed on the device may be utilized. The screen data may be used for entity recognition, for example, by matching results of the ASR operations with different entities associated with the application, such as objects displayed on the user device. In this way, a data source database may be populated with some or all of the screen data provided by the user device to assist in named entity recognition. In this way, the NLU component of the system may be trained or otherwise configured to select an intent based on the screen data corresponding to content that is currently being displayed on the user device. Additionally, the NLU component may determine a value for one or more slots associated with the intent based on the screen data.

At block 906, the process 900 may include identifying first directive data corresponding to the intent data. The first directive data may be configured to, when sent to a device, cause the device to perform an operation with respect to the portion of the content. The intent data determined by the NLU component, with, in examples, assistance from the entity recognition operations, may be sent to a speechlet configured to generate directive data to perform actions with respect to the third-party application. The speechlet may generate the directive data for the device to perform based at least in part on the intent data determined by the remote system. The screen data may be utilized to generate directive data for the device and/or one or more the accessory devices to be performed that effectuates the determined intent.

At block 908, the process 900 may include identifying second directive data corresponding to the intent data. The second directive data may be configured to, when sent to the device, cause the device to perform the operation or another operation with respect to the portion of the content. The second directive data may be identified in a manner similar to how the first directive data was identified with respect to block 906. For example, the user utterance may represent an intent that may be determined to correspond to more than one directive. In these examples, the directive data may be ranked such that an ambiguous utterance may result in a highest-ranked directive data being sent to the user device.

At block 910, the process 900 may include determining a first priority associated with the first directive data from a first content type associated with the portion of the content. The first content type may comprise at least one of text content, image content, and/or a text-input content. The first priority may be determined on a scale, such as 1 to 10. It should be understood that the example scale provided herein is by way of illustration and not limitation. No scale may be used, or any alternative scale may be used. Additionally, in some examples 10 may be the highest priority and 1 may be the lowest priority. Or, 1 may be the highest priority and 10 may be the lowest priority.

At block 912, the process 900 may include determining a second priority associated with the second directive data from a second content type associated with the portion of the content. The second content type may include the same or similar content types as those described above with respect to block 910. For example, an image content type may be prioritized over a text content type, and a text-input content type. Other prioritizations are included in this disclosure that are outside this specific example.

At block 914, the process 900 may include determining that the first directive data is prioritized over the second directive data based on the first content type being prioritized over the second content type. Additionally, or alternatively, prioritizing directive data may be based at least in part on historical use data, the application associated with the displayed content, location of objects with respect to each other as displayed on the user device, categorization of intents, previous user utterances, and/or screen data updating.

For example, historical use data may indicate that a given utterance, while corresponding to multiple directives, historically corresponds to first directive data more frequently than second directive data with respect to utterances received via the user device. Additionally, or alternatively, data indicating that a given utterance, while corresponding to multiple directives, historically corresponds to first directive data more frequently than second directive data with respect to utterances received via the user device and/or other devices. The application may also provide an indication of which directives are to be prioritized more than other directives. Additionally, or alternatively, data indicating the location of objects corresponding to the content with respect to each other as displayed on the user device may be utilized to rank directive data. For example, directives to perform actions on objects that are rendered more prominently may be prioritized more than directives to perform actions on objects that are rendered less prominently. Additionally, or alternatively, certain intents may not be dependent on a specific content displayed on the user device and therefore may be associated with predetermined directive data. For example, a user utterance of "scroll down" may correspond to an intent to display content that is not currently in view on the user device and may not correspond to an intent to perform an action with respect to an object displayed on the user device. Directive data to perform actions based on intents such as this that are not content dependent may be prioritized over directive data to perform actions that are content dependent.

Additionally, or alternatively, data indicating previous utterances may be utilized to rank directive data. For example, a previous utterance may be "scroll down" and a subsequent utterance may be "more." Without contextual data indicating the previous utterance, the utterance of "more" could correspond to directive data to perform actions such as showing more videos, providing more information about a certain video, playing more of a video, etc. However, utilizing the previous utterance of "scroll down," the directive data may be ranked such that a directive to perform an additional scroll down action is prioritized over other directives. Additionally, or alternatively, data indicating that the screen data has changed or otherwise been updated may be utilized to rank directive data. Additionally, or alternatively, a predetermined prioritization of directive data may be stored and utilized by the remote system.

For example, directive data to perform actions on objects associated with the application may be ranked based at least in part on the type of content being acted on. For example, content associated with both an image and text may be prioritized over content with just text, just an image, selectable text, and/or editable text. For example, a user utterance of "play video" may be associated with directive data to perform actions on various objects, such as an image representing a video with a play icon overlaid thereon, text that reads "play," a play icon, and/or an editable field such as a search field to which the phrase "play video" may be inserted. In this example, the directive data associated with the image and overlaid play icon may be prioritized over the other directive data. Likewise, the play icon may be prioritized over the text that reads "play." Likewise, the text that reads "play" may be prioritized over the editable field. The ranking of directive data may be based at least in part on the intent determined by the NLU component. For example, a determined intent of "play" may correspond to a ranking as discussed above. Additionally, or alternatively, a determined intent of "search for" may correspond to a ranking that prioritizes directive data to perform actions on objects associated with editable fields over directive data to perform actions on objects associated with selection of objects. Additionally, or alternatively, a determined intent of "select" may correspond to a ranking that prioritizes directive data to perform actions on objects that, when selected, cause the content to be updated over directive data to perform actions on other objects, such as inserting text into a search field. It should be understood that the examples of directive data ranking are provided herein for illustration, and other examples of ranking directive data are included in this disclosure.

At block 916, the process 900 may include selecting the first directive data based at least in part on the first directive data being prioritized over the second directive data. At block 918, the process 900 may include sending the first directive data to the device to cause an action to be performed on the portion of the content.

Figure 10:
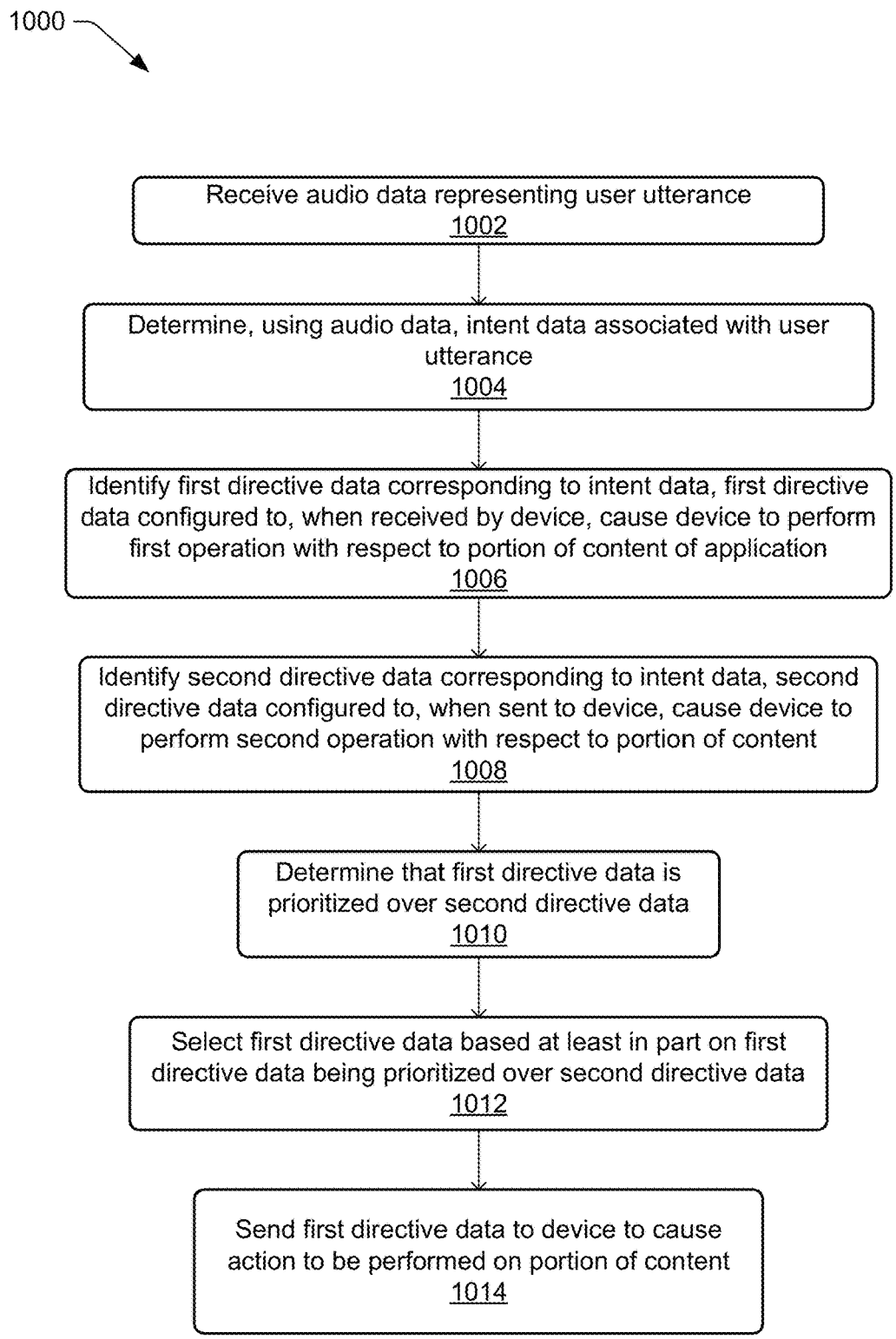
FIG. 10 illustrates a flow diagram of another example process for ranking directive data to be sent to a device displaying content.

FIG. 10 illustrates a flow diagram of an example process 1000 for ranking directives. The order in which the operations or steps are described is not intended to be construed as a limitation, and any number of the described operations may be combined in any order and/or in parallel to implement process 1000.

At block 1002, the process 1000 may include receiving audio data representing a user utterance. The audio data may correspond to audio captured via one or more microphones from an environment in which a device is disposed. For example, the audio may include a user utterance from a user in the environment. Audio corresponding to this utterance may be captured by one or more microphones of the user device and/or an accessory device, and the corresponding audio data may be generated.

At block 1004, the process 1000 may include determining, based at least in part on audio data, intent data associated with the user utterance. Automatic speech recognition (ASR) may be performed on the audio data to generate corresponding text data. Natural language understanding (NLU) techniques may be performed on the text data to determine intent data associated with the user utterance. ASR and NLU techniques are described in more detail below with respect to FIG. 12. As part of determining the intent data associated with the user utterance, named entity recognition may be performed in connection with the natural language understanding to identify portions of the text data that correspond to a named entity that may be recognizable by the remote system. The process may link a text portion to a specific entity known to the remote system.

To perform named entity recognition, screen data indicating objects corresponding to content displayed on the device may be utilized. The screen data may be used for entity recognition, for example, by matching results of the ASR operations with different entities associated with the application, such as objects displayed on the user device. In this way, a data source database may be populated with some or all of the screen data provided by the user device to assist in named entity recognition. In this way, the NLU component of the system may be trained or otherwise configured to select an intent based on the screen data corresponding to content that is currently being displayed on the user device. Additionally, the NLU component may determine a value for one or more slots associated with the intent based on the screen data.

At block 1006, the process 1000 may include identifying first directive data corresponding to the intent data. The first directive data may be configured to, when sent to a device, cause the device to perform an operation. The first directive data may be configured to be sent to a device to perform an operation on an object associated with content displayed on the device. The intent data determined by the NLU component, with, in examples, assistance from the entity recognition operations, may be sent to a speechlet configured to generate directive data to perform actions with respect to the third-party application. The speechlet may generate the directive data for the device to perform based at least in part on the intent data determined by the remote system. The screen data may be utilized to generate directive data for the device and/or one or more the accessory devices to be performed that effectuates the determined intent.

At block 1008, the process 1000 may include identifying second directive data corresponding to the intent data. The second directive data may be configured to, when sent to the device, cause the device to perform the operation or another operation. The second directive data may be identified in a manner similar to how the first directive data was identified with respect to block 1006. For example, the user utterance may represent an intent that may be determined to correspond to more than one directive. In these examples, the directive data may be ranked such that an ambiguous user utterance may result in a highest-ranked directive data being sent to the user device.

At block 1010, the process 1000 may include determining that the first directive data is prioritized over the second directive data. Prioritization of directive data may be based at least in part on historical use data, the application associated with the displayed content, location of objects with respect to each other as displayed on the user device, categorization of intents, previous voice commands, and/or screen data updating.

For example, historical use data may indicate that a given voice command, while corresponding to multiple directives, historically corresponds to first directive data more frequently than second directive data with respect to voice commands received via the user device. Additionally, or alternatively, data indicating that a given utterance, while corresponding to multiple directives, historically corresponds to first directive data more frequently than second directive data with respect to utterances received via the user device and/or other devices. The application may also provide an indication of which directive data is to be prioritized more than other directive data. Additionally, or alternatively, data indicating the location of objects with respect to each other as displayed on the user device may be utilized to rank directive data. For example, directive data to perform actions on objects that are rendered more prominently may be prioritized more than directive data to perform actions on objects that are rendered less prominently. Additionally, or alternatively, certain intents may not be dependent on a specific object displayed on the user device and therefore may be associated with predetermined directive data. For example, a user utterance of "scroll down" may correspond to an intent to display content that is not currently in view on the user device and may not correspond to an intent to perform an action with respect to an object displayed on the user device. Directive data to perform actions based on intents such as this that are not object dependent may be prioritized over directive data to perform actions that are object dependent. By way of further example, the process 1000 may include determining a second intent associated with a second user utterance. A determination may be made that at least one of the first directive data or the second directive data corresponds to the second intent and that third directive data is identified as corresponding to the second intent. In this example, the third directive data may be object and/or content independent such that an action associated with the directive data does not require a value for an object to make the directive actionable. The third directive data may be selected based at least in part on the third directive data being object independent. The third directive data may then be sent to the device.

Additionally, or alternatively, data indicating previous utterances may be utilized to rank directive data. For example, a previous utterance may be "scroll down" and a subsequent utterance may be "more." Without contextual data indicating the previous utterance, the utterance of "more" could correspond to directive data to perform actions such as showing more videos, providing more information about a certain video, playing more of a video, etc. However, utilizing the previous utterance of "scroll down," the directive data may be ranked such that directive data to perform an additional scroll down action is prioritized over other directive data. Additionally, or alternatively, data indicating that the screen data has changed or otherwise been updated may be utilized to rank directive data. Additionally, or alternatively, a predetermined prioritization of directive data may be stored and utilized by the remote system.

For example, directive data to perform actions on objects associated with the application may be ranked based at least in part on the type of object being acted on. In these examples, the process 1000 may include determining that the first directive data is associated with a value associated with the intent, where the value may indicate that a first object on which to perform an operation is associated with a first object type. The process 1000 may also include determining that the value is associated with a second object of a second object type. The ranking of directives may be based at least in part on this ranking, such that directives associated with objects of one type are prioritized over directives associated with objects of another type. For example, objects associated with both an image and text may be prioritized over objects with just text, just an image, selectable text, and/or editable text. For example, a voice command of "play video" may be associated with directives to perform actions on various objects, such as an image representing a video with a play icon overlaid thereon, text that reads "play," a play icon, and/or an editable field such as a search field to which the phrase "play video" may be inserted. In this example, the directive associated with the image and overlaid play icon may be prioritized over the other directives. Likewise, the play icon may be prioritized over the text that reads "play." Likewise, the text that reads "play" may be prioritized over the editable field.

The prioritization of directive data may be based at least in part on the intent data determined by the NLU component. For example, a determined intent of "play" may correspond to a ranking as discussed above. Additionally, or alternatively, a determined intent of "search for" may correspond to a ranking that prioritizes directive data to perform actions on objects associated with editable fields over directive data to perform actions on objects associated with selection of objects. Additionally, or alternatively, a determined intent of "select" may correspond to a ranking that prioritizes directive data to perform actions on objects that, when selected, cause the content to be updated over directive data to perform actions on other objects, such as inserting text into a search field. It should be understood that the examples of directive data ranking are provided herein for illustration, and other examples of ranking directive data are included in this disclosure.

At block 1012, the process 1000 may include selecting the first directive data based at least in part on the first directive data being prioritized over the second directive data. At block 1014, the process 1000 may include sending the first directive data to the device to cause an action to be performed on the object.

The process 1000 may additionally include receiving an indication that content displayed by the device has been updated and determining a second ranking of the first directive data and the second directive data. The process 1000 may also include selecting the second directive data and sending the second directive data to the device based at least in part on the second ranking. In these examples, the updated content displayed on the device may include different objects, may be associated with different actions to be taken on the objects, and/or may be associated with contextual information indicating that certain directive data is sent to the device more prominently than other directive data.

Figure 11:
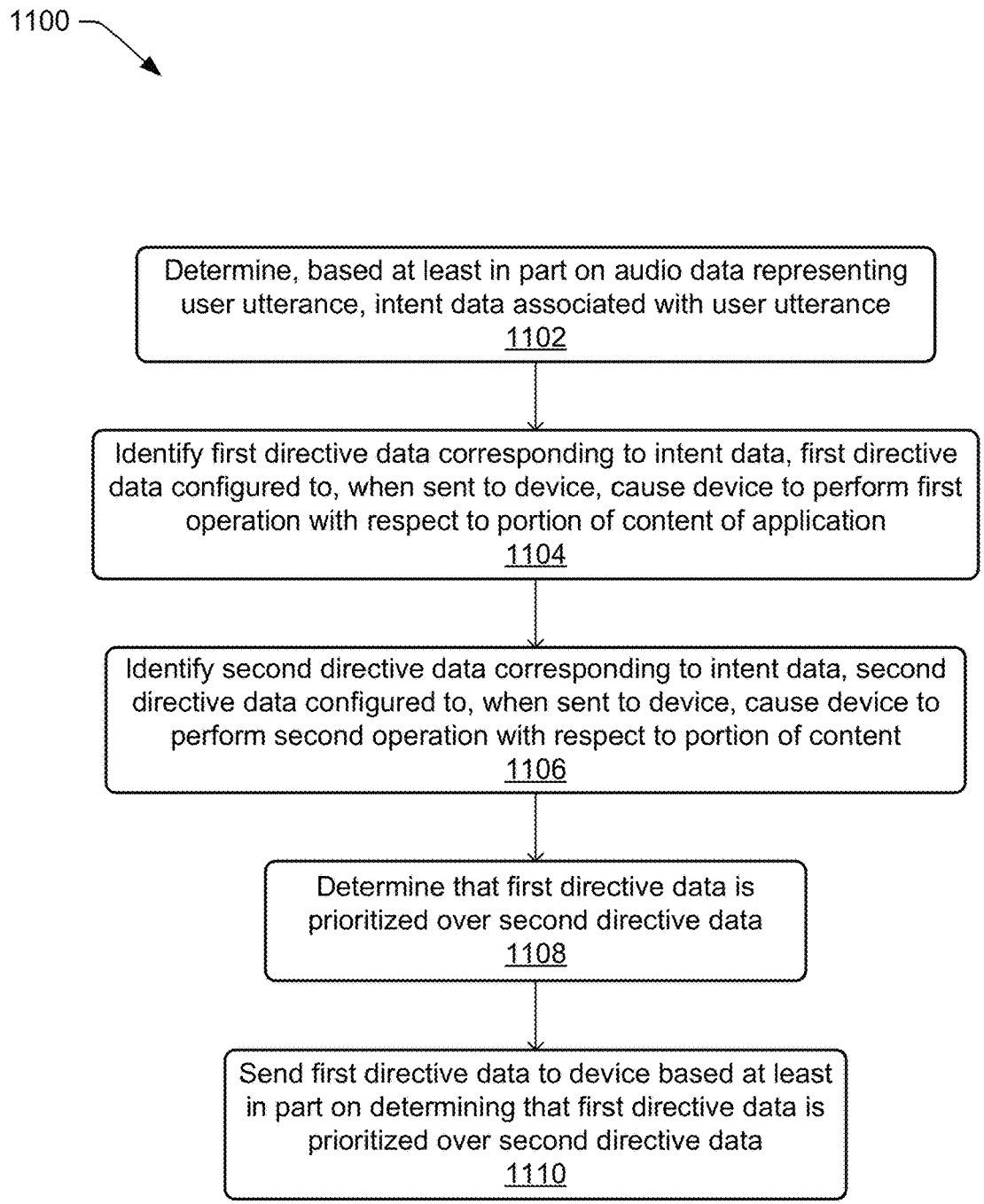
FIG. 11 illustrates a flow diagram of another example process for ranking directive data to be sent to a device displaying content.

FIG. 11 illustrates a flow diagram of an example process 1100 for ranking directives. The order in which the operations or steps are described is not intended to be construed as a limitation, and any number of the described operations may be combined in any order and/or in parallel to implement process 1100.

At block 1102, the process 1100 may include determining, based at least in part on audio data representing a user utterance, an intent data associated with the user utterance. The audio data may correspond to audio captured via one or more microphones from an environment in which a device is disposed. For example, the audio may include a user utterance from a user in the environment. Audio corresponding to this user utterance may be captured by one or more microphones of the user device and/or an accessory device, and the corresponding audio data may be generated. Automatic speech recognition (ASR) may be performed on the audio data to generate corresponding text data. Natural language understanding (NLU) techniques may be performed on the text data to determine intent data associated with the user utterance. ASR and NLU techniques are described in more detail below with respect to FIG. 12. As part of determining the intent data associated with the user utterance, named entity recognition may be performed in connection with the natural language understanding to identify portions of the text data that correspond to a named entity that may be recognizable by the remote system. The process may link a text portion to a specific entity known to the remote system.

To perform named entity recognition, screen data indicating objects displayed on the device may be utilized. The screen data may be used for entity recognition, for example, by matching results of the ASR operations with different entities associated with the application, such as objects displayed on the user device. In this way, a data source database may be populated with some or all of the screen data provided by the user device to assist in named entity recognition. In this way, the NLU component of the system may be trained or otherwise configured to select an intent based on the screen data corresponding to content that is currently being displayed on the user device. Additionally, the NLU component may determine a value for one or more slots associated with the intent based on the screen data.

At block 1104, the process 1100 may include identifying first directive data corresponding to the intent data. The first directive data may be configured to be sent to a device to perform an operation. The first directive data may be configured to be sent to a device to perform an operation on an object associated with content displayed on the device. The intent data determined by the NLU component, with, in examples, assistance from the entity recognition operations, may be sent to a speechlet configured to generate directive data to perform actions with respect to the third-party application. The speechlet may generate the directive data for the device to perform based at least in part on the intent data determined by the remote system. The screen data may be utilized to generate directive data for the device and/or one or more the accessory devices to be performed that effectuates the determined intent.

At block 1106, the process 1100 may include identifying second directive data corresponding to the intent data. The second directive data may be configured to be sent to the device to perform the operation or another operation. The second directive data may be identified in a manner similar to how the first directive data was identified with respect to block 1104. For example, the user utterance may represent an intent that may be determined to correspond to more than one directive. In these examples, the directive data may be ranked such that an ambiguous utterance may result in highest-ranked directive data being sent to the user device.

At block 1108, the process 1100 may include determining that the first directive data is prioritized over the second directive data. Prioritization of directive data may be based at least in part on historical use data, the application associated with the displayed content, location of objects with respect to each other as displayed on the user device, categorization of intents, previous voice commands, and/or screen data updating.

For example, historical use data may indicate that a given user utterance, while corresponding to multiple directives, historically corresponds to first directive data more frequently than second directive data with respect to utterances received via the user device. Additionally, or alternatively, data indicating that a given utterance, while corresponding to multiple directives, historically corresponds to first directive data more frequently than second directive data with respect to utterances received via the other devices. The application may also provide an indication of which directive data is to be prioritized more than other directive data. Additionally, or alternatively, data indicating the location of objects with respect to each other as displayed on the user device may be utilized to rank directive data. For example, directive data to perform actions on objects that are rendered more prominently may be prioritized more than directive data to perform actions on objects that are rendered less prominently. Additionally, or alternatively, certain intents may not be dependent on a specific object displayed on the user device and therefore may be associated with predetermined directive data. For example, a voice command of "scroll down" may correspond to an intent to display content that is not currently in view on the user device and may not correspond to an intent to perform an action with respect to an object displayed on the user device. Directive data to perform actions based on intents such as this that are not object dependent may be prioritized over directive data to perform actions that are object dependent. By way of further example, the process 1100 may include determining a second intent associated with a second user utterance. A determination may be made that at least one of the first directive data or the second directive data corresponds to the second intent and that third directive data is identified as corresponding to the second intent. In this example, the third directive data may be object independent such that an action associated with the directive data does not require a value for an object to make the directive actionable. The third directive data may be selected based at least in part on the third directive data being object independent. The third directive data may then be sent to the device.

Additionally, or alternatively, data indicating previous utterances may be utilized to prioritize directive data. For example, a previous utterance may be "scroll down" and a subsequent utterance may be "more." Without contextual data indicating the previous utterance, the utterance of "more" could correspond to directive data to perform actions such as showing more videos, providing more information about a certain video, playing more of a video, etc. However, utilizing the previous utterance of "scroll down," the directive data may be ranked such that directive data to perform an additional scroll down action is prioritized over other directive data. Additionally, or alternatively, data indicating that the screen data has changed or otherwise been updated may be utilized to rank directive data. Additionally, or alternatively, a predetermined prioritization of directive data may be stored and utilized by the remote system.

For example, directive data to perform actions on objects associated with the application may be prioritized based at least in part on the type of object being acted on. In these examples, the process 1100 may include determining that the first directive data is associated with a value associated with the intent, where the value may indicate that a first object and/or portion of the content corresponding to the object on which to perform an operation is associated with a first object type. The process 1100 may also include determining that the value is associated with a second object of a second object type. The ranking of directive data may be based at least in part on this ranking, such that directive data associated with objects of one type are prioritized over directive data associated with objects of another type. For example, objects associated with both an image and text may be prioritized over objects with just text, just an image, selectable text, and/or editable text. For example, a user utterance of "play video" may be associated with directive data to perform actions on various objects, such as an image representing a video with a play icon overlaid thereon, text that reads "play," a play icon, and/or an editable field such as a search field to which the phrase "play video" may be inserted. In this example, the directive data associated with the image and overlaid play icon may be prioritized over the other directive data. Likewise, the play icon may be prioritized over the text that reads "play." Likewise, the text that reads "play" may be prioritized over the editable field.

The prioritization of directive data may be based at least in part on the intent data determined by the NLU component. For example, a determined intent of "play" may correspond to a ranking as discussed above. Additionally, or alternatively, a determined intent of "search for" may correspond to a ranking that prioritizes directive data to perform actions on objects associated with editable fields over directives to perform actions on objects associated with selection of objects. Additionally, or alternatively, a determined intent of "select" may correspond to a ranking that prioritizes directive data to perform actions on objects that, when selected, cause the content to be updated over directive data to perform actions on other objects, such as inserting text into a search field. It should be understood that the examples of directive data ranking are provided herein for illustration, and other examples of ranking directive data are included in this disclosure.

At block 1110, the process 1100 may include sending the first directive data to the device based at least in part on determining that the first directive data is prioritized over the second directive data.

The process 1100 may additionally include receiving an indication that content displayed by the device has been updated and determining a second ranking of the first directive data and the second directive data. The process 1100 may also include selecting the second directive data and sending the second directive data to the device based at least in part on the second ranking. In these examples, the updated content displayed on the device may include different objects, may be associated with different actions to be taken on the objects, and/or may be associated with contextual information indicating that certain directives are sent to the device more prominently than other directives.

Figure 12:
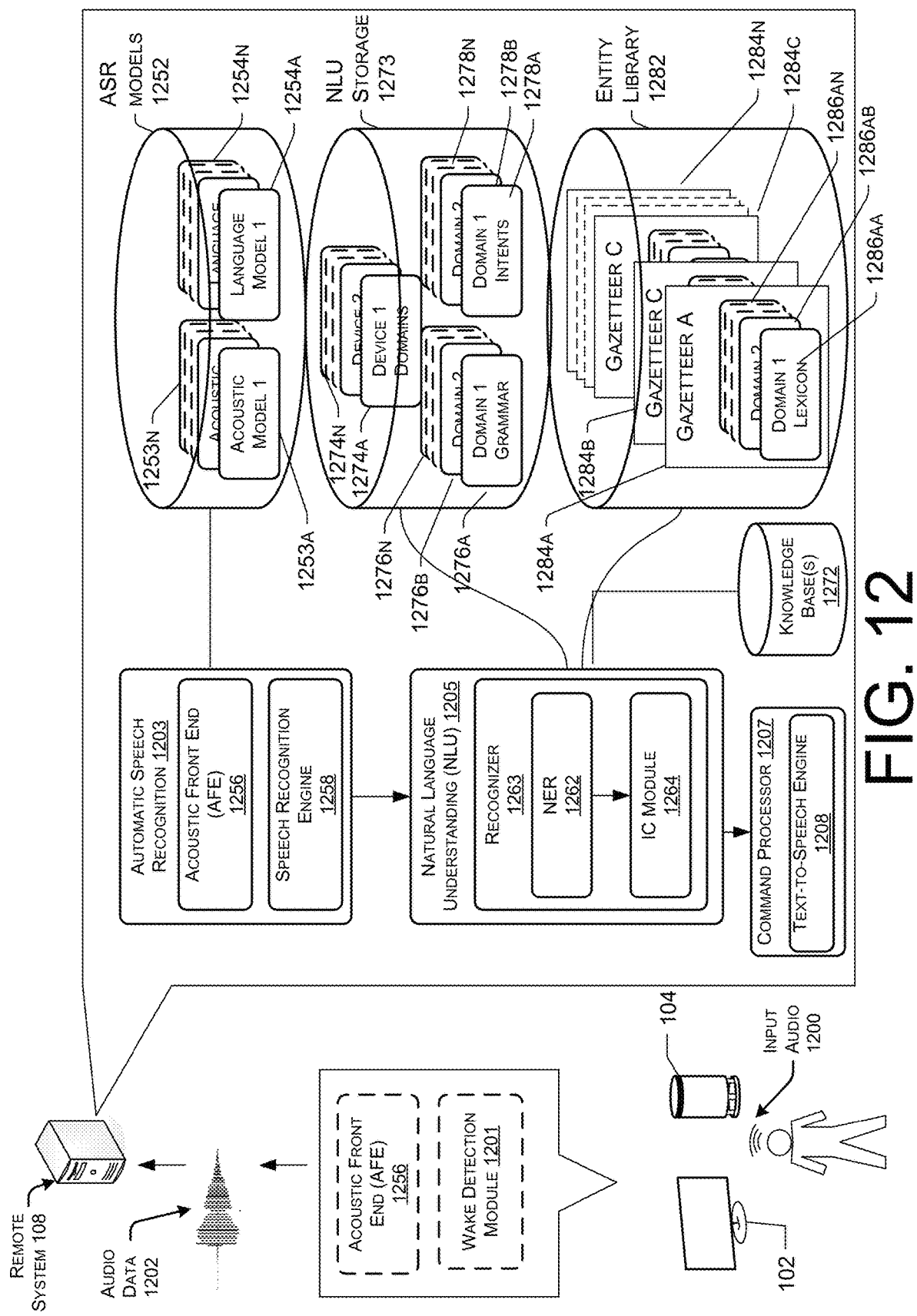
FIG. 12 illustrates a conceptual diagram of components of a speech processing system for processing audio data provided by one or more devices.

FIG. 12 illustrates a conceptual diagram of how a spoken utterance can be processed, allowing a system to capture and execute commands spoken by a user, such as spoken commands that may follow a wakeword, or trigger expression, (i.e., a predefined word or phrase for "waking" a device, causing the device to begin sending audio data to a remote system, such as system 108). The various components illustrated may be located on a same or different physical devices. Communication between various components illustrated in FIG. 12 may occur directly or across a network 110.

An audio capture component, such as a microphone 118 of the user device 102, or another device, captures audio 1200 corresponding to a spoken utterance. The device 102 or 104, using a wakeword detection module 1201, then processes audio data corresponding to the audio 1200 to determine if a keyword (such as a wakeword) is detected in the audio data. Following detection of a wakeword, the device 102 or 104 sends audio data 1202 corresponding to the utterance to the remote system 108 that includes an ASR module 1203. The audio data 1202 may be output from an optional acoustic front end (AFE) 1256 located on the device prior to transmission. In other instances, the audio data 1202 may be in a different form for processing by a remote AFE 1256, such as the AFE 1256 located with the ASR module 1203 of the remote system 108.

The wakeword detection module 1201 works in conjunction with other components of the user device, for example a microphone to detect keywords in audio 1200. For example, the device may convert audio 1200 into audio data, and process the audio data with the wakeword detection module 1201 to determine whether human sound is detected, and if so, if the audio data comprising human sound matches an audio signature and/or model corresponding to a particular keyword.

The user device may use various techniques to determine whether audio data includes human sound. Some embodiments may apply voice activity detection (VAD) techniques. Such techniques may determine whether human sound is present in an audio input based on various quantitative aspects of the audio input, such as the spectral slope between one or more frames of the audio input; the energy levels of the audio input in one or more spectral bands; the signal-to-noise ratios of the audio input in one or more spectral bands; or other quantitative aspects. In other embodiments, the user device may implement a limited classifier configured to distinguish human sound from background noise. The classifier may be implemented by techniques such as linear classifiers, support vector machines, and decision trees. In still other embodiments, Hidden Markov Model (HMM) or Gaussian Mixture Model (GMM) techniques may be applied to compare the audio input to one or more acoustic models in human sound storage, which acoustic models may include models corresponding to human sound, noise (such as environmental noise or background noise), or silence. Still other techniques may be used to determine whether human sound is present in the audio input.

Once human sound is detected in the audio received by user device (or separately from human sound detection), the user device may use the wakeword detection module 1201 to perform wakeword detection to determine when a user intends to speak a command to the user device. This process may also be referred to as keyword detection, with the wakeword being a specific example of a keyword. Specifically, keyword detection may be performed without performing linguistic analysis, textual analysis or semantic analysis. Instead, incoming audio (or audio data) is analyzed to determine if specific characteristics of the audio match preconfigured acoustic waveforms, audio signatures, or other data to determine if the incoming audio "matches" stored audio data corresponding to a keyword.

Thus, the wakeword detection module 1201 may compare audio data to stored models or data to detect a wakeword. One approach for wakeword detection applies general large vocabulary continuous speech recognition (LVCSR) systems to decode the audio signals, with wakeword searching conducted in the resulting lattices or confusion networks. LVCSR decoding may require relatively high computational resources. Another approach for wakeword spotting builds hidden Markov models (HMM) for each key wakeword word and non-wakeword speech signals respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on keyword presence. This approach can be extended to include discriminative information by incorporating hybrid DNN-HMM decoding framework. In another embodiment, the wakeword spotting system may be built on deep neural network (DNN)/recursive neural network (RNN) structures directly, without HMM involved. Such a system may estimate the posteriors of wakewords with context information, either by stacking frames within a context window for DNN, or using RNN. Following-on posterior threshold tuning or smoothing is applied for decision making. Other techniques for wakeword detection, such as those known in the art, may also be used.

Once the wakeword is detected, the local device 102 and/or 104 may "wake" and begin transmitting audio data 1202 corresponding to input audio 1200 to the remote system 108 for speech processing. Audio data corresponding to that audio may be sent to remote system 108 for routing to a recipient device or may be sent to the remote system 108 for speech processing for interpretation of the included speech (either for purposes of enabling voice-communications and/or for purposes of executing a command in the speech). The audio data 1202 may include data corresponding to the wakeword, or the portion of the audio data corresponding to the wakeword may be removed by the local device 102 and/or 104 prior to sending. Further, a local device may "wake" upon detection of speech/spoken audio above a threshold, as described herein. Upon receipt by the remote system 108, an ASR module 1203 may convert the audio data 1202 into text. The ASR transcribes audio data into text data representing the words of the speech contained in the audio data 1202. The text data may then be used by other components for various purposes, such as executing system commands, inputting data, etc. A spoken utterance in the audio data is input to a processor configured to perform ASR which then interprets the utterance based on the similarity between the utterance and pre-established language models 1254 stored in an ASR model knowledge base (ASR Models Storage 1252). For example, the ASR process may compare the input audio data with models for sounds (e.g., subword units or phonemes) and sequences of sounds to identify words that match the sequence of sounds spoken in the utterance of the audio data.

The different ways a spoken utterance may be interpreted (i.e., the different hypotheses) may each be assigned a probability or a confidence score representing the likelihood that a particular set of words matches those spoken in the utterance. The confidence score may be based on a number of factors including, for example, the similarity of the sound in the utterance to models for language sounds (e.g., an acoustic model 1253 stored in an ASR Models Storage 1252), and the likelihood that a particular word that matches the sounds would be included in the sentence at the specific location (e.g., using a language or grammar model). Thus, each potential textual interpretation of the spoken utterance (hypothesis) is associated with a confidence score. Based on the considered factors and the assigned confidence score, the ASR process 1203 outputs the most likely text recognized in the audio data. The ASR process may also output multiple hypotheses in the form of a lattice or an N-best list with each hypothesis corresponding to a confidence score or other score (such as probability scores, etc.).

The device or devices performing the ASR processing may include an acoustic front end (AFE) 1256 and a speech recognition engine 1258. The acoustic front end (AFE) 1256 transforms the audio data from the microphone into data for processing by the speech recognition engine 1258. The speech recognition engine 1258 compares the speech recognition data with acoustic models 1253, language models 1254, and other data models and information for recognizing the speech conveyed in the audio data. The AFE 1256 may reduce noise in the audio data and divide the digitized audio data into frames representing time intervals for which the AFE 1256 determines a number of values, called features, representing the qualities of the audio data, along with a set of those values, called a feature vector, representing the features/qualities of the audio data within the frame. Many different features may be determined, as known in the art, and each feature represents some quality of the audio that may be useful for ASR processing. A number of approaches may be used by the AFE to process the audio data, such as mel-frequency cepstral coefficients (MFCCs), perceptual linear predictive (PLP) techniques, neural network feature vector techniques, linear discriminant analysis, semi-tied covariance matrices, or other approaches known to those of skill in the art.

The speech recognition engine 1258 may process the output from the AFE 1256 with reference to information stored in speech/model storage (1252). Alternatively, post front-end processed data (such as feature vectors) may be received by the device executing ASR processing from another source besides the internal AFE. For example, the user device may process audio data into feature vectors (for example using an on-device AFE 1256) and transmit that information to a server across a network for ASR processing. Feature vectors may arrive at the remote system 108 encoded, in which case they may be decoded prior to processing by the processor executing the speech recognition engine 1258.

The speech recognition engine 1258 attempts to match received feature vectors to language phonemes and words as known in the stored acoustic models 1253 and language models 1254. The speech recognition engine 1258 computes recognition scores for the feature vectors based on acoustic information and language information. The acoustic information is used to calculate an acoustic score representing a likelihood that the intended sound represented by a group of feature vectors matches a language phoneme. The language information is used to adjust the acoustic score by considering what sounds and/or words are used in context with each other, thereby improving the likelihood that the ASR process will output speech results that make sense grammatically. The specific models used may be general models or may be models corresponding to a particular domain, such as music, banking, etc.

The speech recognition engine 1258 may use a number of techniques to match feature vectors to phonemes, for example using Hidden Markov Models (HMMs) to determine probabilities that feature vectors may match phonemes. Sounds received may be represented as paths between states of the HMM and multiple paths may represent multiple possible text matches for the same sound.

Following ASR processing, the ASR results may be sent by the speech recognition engine 1258 to other processing components, which may be local to the device performing ASR and/or distributed across the network(s). For example, ASR results in the form of a single textual representation of the speech, an N-best list including multiple hypotheses and respective scores, lattice, etc. may be sent to the remote system 108, for natural language understanding (NLU) processing, such as conversion of the text into commands for execution, either by the user device, by the remote system 108, or by another device (such as a server running a specific application like a search engine, etc.).

The device performing NLU processing 1205 (e.g., server 108) may include various components, including potentially dedicated processor(s), memory, storage, etc. As shown in FIG. 12, an NLU component 1205 may include a recognizer 1263 that includes a named entity recognition (NER) module 1262 which is used to identify portions of query text that correspond to a named entity that may be recognizable by the system. A downstream process called named entity resolution links a text portion to a specific entity known to the system. To perform named entity resolution, the system may utilize gazetteer information (1284a-1284n) stored in entity library storage 1282. The gazetteer information may be used for entity resolution, for example matching ASR results with different entities (such as song titles, contact names, etc.) Gazetteers may be linked to users (for example a particular gazetteer may be associated with a specific user's music collection), may be linked to certain domains (such as shopping), or may be organized in a variety of other ways.

Generally, the NLU process takes textual input (such as processed from ASR 1203 based on the utterance input audio 1200) and attempts to make a semantic interpretation of the text. That is, the NLU process determines the meaning behind the text based on the individual words and then implements that meaning. NLU processing 1205 interprets a text string to derive an intent or a desired action from the user as well as the pertinent pieces of information in the text that allow a device (e.g., device 102 and/or 104) to complete that action. For example, if a spoken utterance is processed using ASR 1203 and outputs the text "play Jeopardy" the NLU process may determine that the user intended for the device to initiate a game of Jeopardy.

The NLU may process several textual inputs related to the same utterance. For example, if the ASR 1203 outputs N text segments (as part of an N-best list), the NLU may process all N outputs to obtain NLU results.

As will be discussed further below, the NLU process may be configured to parse and tag to annotate text as part of NLU processing. For example, for the text "play You're Welcome," "play" may be tagged as a command (to access a song and output corresponding audio) and "You're Welcome" may be tagged as a specific video to be played.

To correctly perform NLU processing of speech input, an NLU process 1205 may be configured to determine a "domain" of the utterance so as to determine and narrow down which services offered by the endpoint device (e.g., remote system 108 or the user device) may be relevant. For example, an endpoint device may offer services relating to interactions with a telephone service, a contact list service, a calendar/scheduling service, a music player service, etc. Words in a single text query may implicate more than one service, and some services may be functionally linked (e.g., both a telephone service and a calendar service may utilize data from the contact list).

The named entity recognition (NER) module 1262 receives a query in the form of ASR results and attempts to identify relevant grammars and lexical information that may be used to construe meaning. To do so, the NLU module 1205 may begin by identifying potential domains that may relate to the received query. The NLU storage 1273 includes a database of devices (1274a-1274n) identifying domains associated with specific devices. For example, the user device may be associated with domains for music, telephony, calendaring, contact lists, and device-specific communications, but not video. In addition, the entity library may include database entries about specific services on a specific device, either indexed by Device ID, User ID, or Household ID, or some other indicator.

In NLU processing, a domain may represent a discrete set of activities having a common theme, such as "shopping," "music," "calendaring," etc. As such, each domain may be associated with a particular recognizer 1263, language model and/or grammar database (1276a-1276n), a particular set of intents/actions (1278a-1278n), and a particular personalized lexicon (1286). Each gazetteer (1284a-1284n) may include domain-indexed lexical information associated with a particular user and/or device. For example, the Gazetteer A (1284a) includes domain-index lexical information 1286aa to 1286an. A user's contact-list lexical information might include the names of contacts. Since every user's contact list is presumably different, this personalized information improves entity resolution.

As noted above, in traditional NLU processing, a query may be processed applying the rules, models, and information applicable to each identified domain. For example, if a query potentially implicates both communications and, for example, music, the query may, substantially in parallel, be NLU processed using the grammar models and lexical information for communications, and will be processed using the grammar models and lexical information for music. The responses based on the query produced by each set of models is scored, with the overall highest ranked result from all applied domains ordinarily selected to be the correct result.

An intent classification (IC) module 1264 parses the query to determine an intent or intents for each identified domain, where the intent corresponds to the action to be performed that is responsive to the query. Each domain is associated with a database (1278a-1278n) of words linked to intents. For example, a music intent database may link words and phrases such as "quiet," "volume off," and "mute" to a "mute" intent. A voice-message intent database, meanwhile, may link words and phrases such as "send a message," "send a voice message," "send the following," or the like. The IC module 1264 identifies potential intents for each identified domain by comparing words in the query to the words and phrases in the intents database 1278. In some instances, the determination of an intent by the IC module 1264 is performed using a set of rules or templates that are processed against the incoming text to identify a matching intent.

In order to generate a particular interpreted response, the NER 1262 applies the grammar models and lexical information associated with the respective domain to actually recognize a mention of one or more entities in the text of the query. In this manner, the NER 1262 identifies "slots" or values (i.e., particular words in query text) that may be needed for later command processing. Depending on the complexity of the NER 1262, it may also label each slot with a type of varying levels of specificity (such as noun, place, city, artist name, song name, or the like). Each grammar model 1276 includes the names of entities (i.e., nouns) commonly found in speech about the particular domain (i.e., generic terms), whereas the lexical information 1286 from the gazetteer 1284 is personalized to the user(s) and/or the device. For instance, a grammar model associated with the shopping domain may include a database of words commonly used when people discuss shopping.

The intents identified by the IC module 1264 are linked to domain-specific grammar frameworks (included in 1276) with "slots" or "fields" to be filled with values. Each slot/field corresponds to a portion of the query text that the system believes corresponds to an entity. To make resolution more flexible, these frameworks would ordinarily not be structured as sentences, but rather based on associating slots with grammatical tags. For example, if "play a song" is an identified intent, a grammar (1276) framework or frameworks may correspond to sentence structures such as "play the song {song title}" and/or "play {song title}."

For example, the NER module 1262 may parse the query to identify words as subject, object, verb, preposition, etc., based on grammar rules and/or models, prior to recognizing named entities. The identified verb may be used by the IC module 1264 to identify intent, which is then used by the NER module 1262 to identify frameworks. A framework for the intent of "play a song," meanwhile, may specify a list of slots/fields applicable to play the identified "song" and any object modifier (e.g., specifying a music collection from which the song should be accessed) or the like. The NER module 1262 then searches the corresponding fields in the domain-specific and personalized lexicon(s), attempting to match words and phrases in the query tagged as a grammatical object or object modifier with those identified in the database(s).

This process includes semantic tagging, which is the labeling of a word or combination of words according to their type/semantic meaning. Parsing may be performed using heuristic grammar rules, or an NER model may be constructed using techniques such as hidden Markov models, maximum entropy models, log linear models, conditional random fields (CRF), and the like.

The frameworks linked to the intent are then used to determine what database fields should be searched to determine the meaning of these phrases, such as searching a user's gazette for similarity with the framework slots. If the search of the gazetteer does not resolve the slot/field using gazetteer information, the NER module 1262 may search the database of generic words associated with the domain (in the knowledge base 1272). So, for instance, if the query was "play You're Welcome," after failing to determine which song titled "You're Welcome" should be played, the NER component 1262 may search the domain vocabulary for the phrase "You're Welcome." In the alternative, generic words may be checked before the gazetteer information, or both may be tried, potentially producing two different results.

The output data from the NLU processing (which may include tagged text, commands, etc.) may then be sent to a command processor 1207. The destination command processor 1207 may be determined based on the NLU output. For example, if the NLU output includes a command to send a message, the destination command processor 1207 may be a message sending application, such as one located on the user device or in a message sending appliance, configured to execute a message sending command. If the NLU output includes a search request, the destination command processor 1207 may include a search engine processor, such as one located on a search server, configured to execute a search command. After the appropriate command is generated based on the intent of the user, the command processor 1207 may provide some or all of this information to a text-to-speech (TTS) engine 1208. The TTS engine 1208 may then generate an actual audio file for outputting the audio data determined by the command processor 1207 (e.g., "playing your song," or "lip syncing to . . . "). After generating the file (or "audio data"), the TTS engine 1207 may provide this data back to the remote system 108.

The NLU operations of existing systems may take the form of a multi-domain architecture. Each domain (which may include a set of intents and entity slots that define a larger concept such as music, books etc. as well as components such as trained models, etc. used to perform various NLU operations such as NER, IC, or the like) may be constructed separately and made available to an NLU component 1205 during runtime operations where NLU operations are performed on text (such as text output from an ASR component 1203). Each domain may have specially configured components to perform various steps of the NLU operations.

For example, in a NLU system, the system may include a multi-domain architecture consisting of multiple domains for intents/commands executable by the system (or by other devices connected to the system), such as music, video, books, and information. The system may include a plurality of domain recognizers, where each domain may include its own recognizer 1263. Each recognizer may include various NLU components such as an NER component 1262, IC module 1264 and other components such as an entity resolver, or other components.

For example, a messaging domain recognizer 1263-A (Domain A) may have an NER component 1262-A that identifies what slots (i.e., portions of input text) may correspond to particular words relevant to that domain. The words may correspond to entities such as (for the messaging domain) a recipient. An NER component 1262 may use a machine learning model, such as a domain specific conditional random field (CRF) to both identify the portions corresponding to an entity as well as identify what type of entity corresponds to the text portion. The messaging domain recognizer 1263-A may also have its own intent classification (IC) component 1264-A that determines the intent of the text assuming that the text is within the proscribed domain. An IC component may use a model, such as a domain specific maximum entropy classifier to identify the intent of the text, where the intent is the action the user desires the system to perform. For this purpose, the remote system computing device 108 may include a model training component. The model training component may be used to train the classifier(s)/machine learning models discussed above.

As noted above, multiple devices may be employed in a single speech processing system. In such a multi-device system, each of the devices may include different components for performing different aspects of the speech processing. The multiple devices may include overlapping components. The components of the user device and the remote system 108, as illustrated herein are exemplary, and may be located in a stand-alone device or may be included, in whole or in part, as a component of a larger device or system, may be distributed across a network or multiple devices connected by a network, etc.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A system comprising:
   one or more processors; and
   non-transitory computer-readable media storing computer-executable instructions that, when executed by the one or more processors, cause the one or more processors to perform operations comprising:
   receiving, from a device, audio data representing a user utterance to control display of content on a display;
   determining a content-streaming application associated with the content being displayed on the display;
   generating, based at least in part on the audio data and the content-streaming application, a command to control display of the content; and
   sending the command to the device, the command causing the content-streaming application to control the display of the content on the device.

2. The system of claim 1, the operations further comprising:
   determining intent data based at least in part on the audio data;
   identifying first data corresponding to the intent data, the first data configured to, when sent to the device, cause the device to perform a first operation with respect to a portion of the content;
   identifying second data corresponding to the intent data, the second data configured to, when received by the device, cause the device to perform a second operation with respect to the portion of the content; and
   determining that the first data is prioritized over the second data.

3. The system of claim 2, wherein generating the command comprises generating the command based at least in part on the first data being prioritized over the second data.

4. The system of claim 1, wherein the content comprises first content and sending the command to the device causes second content to be displayed on the display.

5. The system of claim 1, wherein sending the command to the device causes a volume of audio associated with the content to be adjusted.

6. The system of claim 1, wherein the content is displayed in a first state and sending the command to the device causes the content to change from the first state to a second state, wherein the content changing from the first state to the second state causes the content to pause, resume, or stop.

7. The system of claim 1, wherein sending the command to the device causes the content to rewind or fast forward a specified amount of time, wherein the specified amount of time is indicated in the audio data.

8. The system of claim 1, wherein sending the command to the device causes information associated with the content to be displayed.

9. A method, comprising:
   receiving, from a device, audio data representing a user utterance to control display of content on a screen;
   determining that a content-streaming application is associated with the content being displayed on the screen;
   generating, based at least in part on the audio data, a command to control display of the content, the command associated with the content-streaming application; and sending the command to the device, the command causing the content-streaming application to control the display of the content on the device.

10. The method of claim 9, wherein the content-streaming application comprises a first content-streaming application and sending the command to the device causes a second content-streaming application to open.

11. The method of claim 9, wherein the content comprises first content and sending the command to the device causes at least a portion of the first content on the screen to change to second content.

12. The method of claim 9, wherein the content is displayed in a first state and sending the command to the device causes the content to change from the first state to a second state that is different than the first state.

13. The method of claim 9, wherein sending the command to the device causes information associated with the content to be displayed on the screen along with the content.

14. The method of claim 9, wherein sending the command to the device causes a volume of the content to be adjusted.

15. The method of claim 9, wherein generating the command further comprises:
   determining, based at least in part on the audio data, intent data associated with the user utterance;
   identifying first data corresponding to the intent data, the first data configured to, when sent to the device, cause the device to perform a first operation with respect to at least a portion of the content;
   identifying second data corresponding to the intent data, the second data configured to, when sent to the device, cause the device to perform a second operation with respect to at least a portion of the content; and
   determining that the first data is prioritized over the second data, wherein generating the command is based at least in part on the first data being prioritized over the second data.

16. A system, comprising:
   one or more processors; and
   non-transitory computer-readable media storing computer-executable instructions that, when executed by the one or more processors, cause the one or more processors to perform operations comprising:
      receiving, from a device, audio data representing a user utterance to control content presented on a display;
      determining an application associated with the content being displayed on the display;
      generating, based at least in part on the audio data and the application, a command to control display of the content; and
      sending the command to the device, the command causing the application to control display of the content on the display.

17. The system of claim 16, wherein the content includes audio output data and sending the command to the device alters the audio output data.

18. The system of claim 16, wherein the content is displayed in a first state and sending the command to the device causes the content to change from the first state to a second state that is different than the first state.

19. The system of claim 16, wherein the application is a first application and sending the command to the device causes a second application to open, the second application configured to use account data associated with the device.

20. The system of claim 16, wherein sending the command to the device causes the content to rewind or fast forward a specified amount of time, wherein the specified amount of time is indicated in the audio data.

* * * * *